(12) United States Patent
Kamiya

(10) Patent No.: US 11,588,531 B2
(45) Date of Patent: Feb. 21, 2023

(54) SIGNAL ESTIMATION APPARATUS, SIGNAL ESTIMATION METHOD AND PROGRAM RECORDING MEDIUM

(71) Applicant: NEC Corporation, Tokyo (JP)

(72) Inventor: Norifumi Kamiya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 51 days.

(21) Appl. No.: 17/220,241

(22) Filed: Apr. 1, 2021

(65) Prior Publication Data

US 2021/0320707 A1    Oct. 14, 2021

(30) Foreign Application Priority Data

Apr. 8, 2020    (JP) .............................. JP2020-069699

(51) Int. Cl.
     *H04L 27/26*      (2006.01)
     *H04B 7/06*      (2006.01)
     (Continued)

(52) U.S. Cl.
     CPC ......... *H04B 7/0634* (2013.01); *H04B 7/0413* (2013.01); *H04B 17/29* (2015.01);
     (Continued)

(58) Field of Classification Search
     CPC .............. H04L 25/0242; H04L 27/265; H04L 25/03006; H04L 2025/03611;
     (Continued)

(56) References Cited

U.S. PATENT DOCUMENTS

| 7,079,866 B2 * | 7/2006 | Takano ................. H01Q 3/267 |
| | | 455/562.1 |
| 10,700,800 B2 * | 6/2020 | Giannakis ........... H04L 25/0242 |

(Continued)

FOREIGN PATENT DOCUMENTS

| JP | 5317021 B2 | 10/2013 |
| JP | 2015-073260 A | 4/2015 |

(Continued)

OTHER PUBLICATIONS

Sasaki et al., "Experiment on Over-100-Gbps Wireless Transmission with OAM-MIMO Multiplexing System in 28-GHz Band", 2018 IEEE Global Communications Conference (GLOBECON), Dec. 2018.

(Continued)

*Primary Examiner* — Lan-Huong Truong

(57) ABSTRACT

An apparatus performs a discrete Fourier transform process on M×N received signal components included in a received signal, by a unit of N received signal components; and estimates an estimated signal containing M×N estimated signal components, which are estimated values of M×N transmission signal components, on the basis of the received signal on which the discrete Fourier transform process is performed. When the estimated signal xe is newly estimated, the apparatus performs an exclusion operation of excluding an estimated value $xe^{(k)}$ of the M transmission signal components that constitute a k-th transmission signal group from the estimated signal xe newly estimated, and updates the estimated value $xe^{(k)}$ based on an intermediate signal $xt^{(k)}$ obtained by the exclusion operation and the received signal, thereby re-estimating the estimated signal xe.

9 Claims, 10 Drawing Sheets

(51) Int. Cl.
  *H04B 17/309* (2015.01)
  *H04B 7/0413* (2017.01)
  *H04B 17/29* (2015.01)
  *H04L 25/02* (2006.01)

(52) U.S. Cl.
  CPC ....... *H04B 17/309* (2015.01); *H04L 25/0242* (2013.01); *H04L 27/265* (2013.01)

(58) Field of Classification Search
  CPC .... H04B 7/0634; H04B 7/0413; H04B 17/29; H04B 17/309; H04B 17/345
  See application file for complete search history.

(56) References Cited

U.S. PATENT DOCUMENTS

| | | | |
|---|---|---|---|
| 2006/0093065 A1* | 5/2006 | Thomas | ............... H04B 7/0639 375/299 |
| 2010/0290552 A1 | 11/2010 | Sasaki | |
| 2015/0063482 A1 | 3/2015 | Zhou et al. | |
| 2017/0170574 A1 | 6/2017 | Sacco et al. | |
| 2017/0317700 A1* | 11/2017 | Ueki | ..................... H04W 24/08 |
| 2018/0019835 A1 | 1/2018 | Kamiya | |
| 2020/0296599 A1 | 9/2020 | Sasaki et al. | |

FOREIGN PATENT DOCUMENTS

| | | |
|---|---|---|
| JP | 2017-515337 A | 6/2017 |
| JP | 6583292 B2 | 10/2019 |
| WO | 2019/059408 A1 | 3/2019 |

OTHER PUBLICATIONS

Hirabe et al., "40m of OAM mode and Polarization Multiplexing in E-band", IEEE Global Communications Conference (GLOBECON) 2019, Dec. 2019.

* cited by examiner

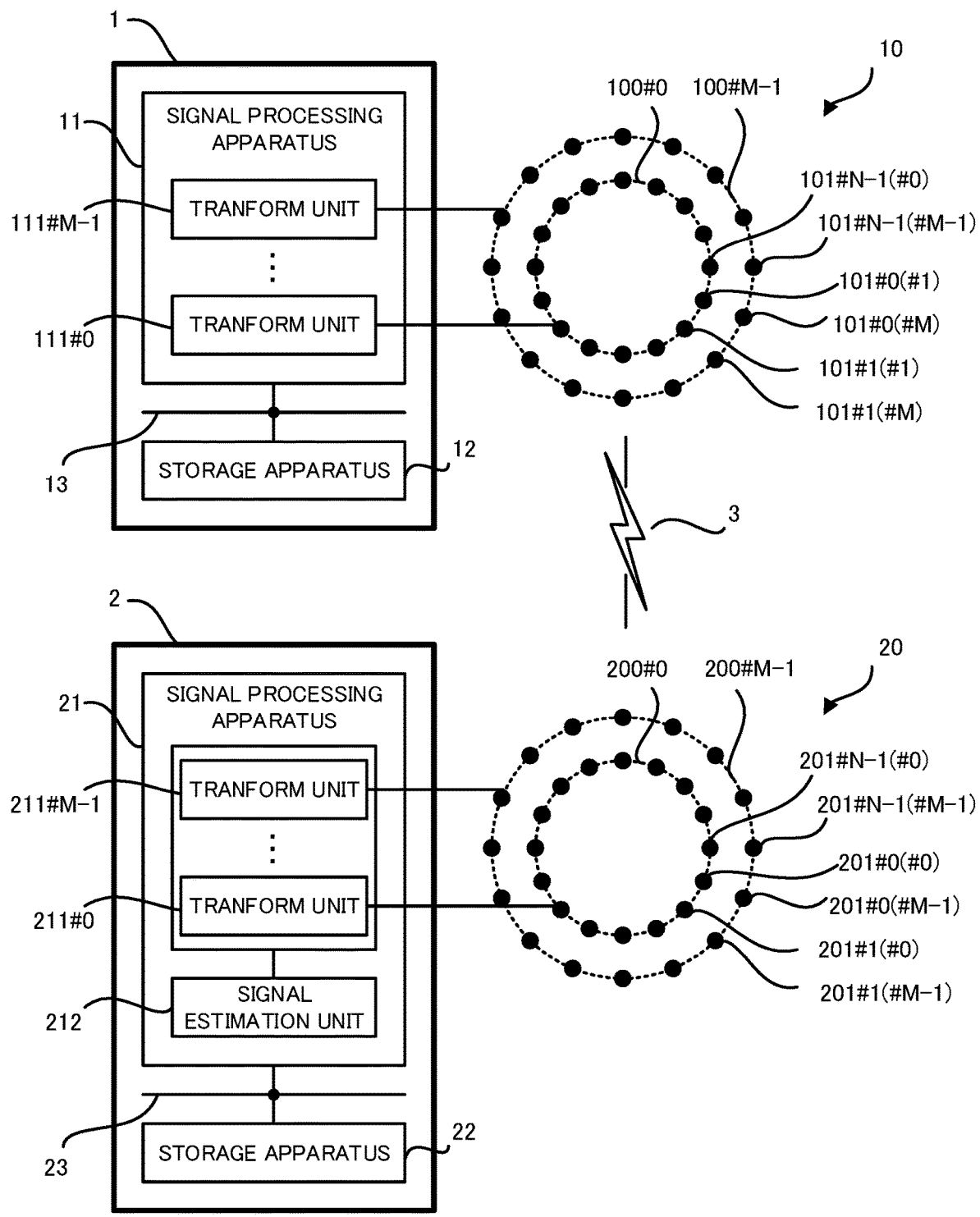

FIG. 2

$$x = \begin{bmatrix} x^{(0)} \\ x^{(1)} \\ \vdots \\ x^{(k)} \\ \vdots \\ x^{(N-1)} \end{bmatrix} = \begin{bmatrix} x^{(0)}_{(0)} & x^{(0)}_{(1)} & \cdots & x^{(0)}_{(i)} & \cdots & x^{(0)}_{(M-1)} \\ x^{(1)}_{(0)} & x^{(1)}_{(1)} & \cdots & x^{(1)}_{(i)} & \cdots & x^{(1)}_{(M-1)} \\ \vdots & \vdots & & \vdots & & \vdots \\ x^{(k)}_{(0)} & x^{(k)}_{(1)} & \cdots & x^{(k)}_{(i)} & \cdots & x^{(k)}_{(M-1)} \\ \vdots & \vdots & & \vdots & & \vdots \\ x^{(N-1)}_{(0)} & x^{(N-1)}_{(1)} & \cdots & x^{(N-1)}_{(i)} & \cdots & x^{(N-1)}_{(M-1)} \end{bmatrix}$$

FIG. 3

$$y = \begin{bmatrix} y^{(0)} \\ y^{(1)} \\ \vdots \\ y^{(k)} \\ \vdots \\ y^{(N-1)} \end{bmatrix} = \begin{bmatrix} y^{(0)}_{(0)} & y^{(0)}_{(1)} & \cdots & y^{(0)}_{(i)} & \cdots & y^{(0)}_{(M-1)} \\ y^{(1)}_{(0)} & y^{(1)}_{(1)} & \cdots & y^{(1)}_{(i)} & \cdots & y^{(1)}_{(M-1)} \\ \vdots & \vdots & & \vdots & & \vdots \\ y^{(k)}_{(0)} & y^{(k)}_{(1)} & \cdots & y^{(k)}_{(i)} & \cdots & y^{(k)}_{(M-1)} \\ \vdots & \vdots & & \vdots & & \vdots \\ y^{(N-1)}_{(0)} & y^{(N-1)}_{(1)} & \cdots & y^{(N-1)}_{(i)} & \cdots & y^{(N-1)}_{(M-1)} \end{bmatrix}$$

FIG. 4

$$\begin{bmatrix} y^{(0)} \\ y^{(1)} \\ \vdots \\ y^{(k)} \\ \vdots \\ y^{(N-1)} \end{bmatrix} = \begin{bmatrix} H^{(0,0)} & H^{(0,1)} & \cdots & H^{(0,k)} & \cdots & H^{(0,N-1)} \\ H^{(1,0)} & H^{(1,1)} & \cdots & H^{(1,k)} & \cdots & H^{(1,N-1)} \\ \vdots & \vdots & & \vdots & & \vdots \\ H^{(k,0)} & H^{(k,1)} & \cdots & H^{(k,k)} & \cdots & H^{(k,N-1)} \\ \vdots & \vdots & & \vdots & & \vdots \\ H^{(N-1,0)} & H^{(N-1,1)} & \cdots & H^{(N-1,k)} & \cdots & H^{(N-1,N-1)} \end{bmatrix} \times \begin{bmatrix} x^{(0)} \\ x^{(1)} \\ \vdots \\ x^{(k)} \\ \vdots \\ x^{(N-1)} \end{bmatrix} + \begin{bmatrix} n^{(0)} \\ n^{(1)} \\ \vdots \\ n^{(k)} \\ \vdots \\ n^{(N-1)} \end{bmatrix}$$

FIG. 5

$$\begin{bmatrix} H^{(0,0)} & 0 & \cdots\cdots & 0 \\ 0 & H^{(1,1)} & \cdots\cdots & 0 \\ \vdots & \vdots & \ddots & \vdots \\ \vdots & \vdots & & \vdots \\ \vdots & \vdots & & \vdots \\ 0 & 0 & \cdots\cdots & H^{(N-1,N-1)} \end{bmatrix}$$

SIGNAL ESTIMATION APPARATUS, SIGNAL ESTIMATION METHOD AND PROGRAM RECORDING MEDIUM

INCORPORATION BY REFERENCE

This application is based upon and claims the benefit of priority from Japanese Patent Application No. 2020-069699, filed on Apr. 8, 2020, the disclosure of which is incorporated herein in its entirety by reference.

TECHNICAL FIELD

Embodiments of the present disclosure relate to a signal estimation apparatus and a signal estimation method that estimate a transmission signal transmitted by a transmitting apparatus on the basis of a received signal received by a receiving apparatus, and relate to a program recording medium for performing the signal estimation method described above.

BACKGROUND ART

Recently, research has been carried out on a communication system in which signals are transmitted and received by using an OAM-MIMO (Orbital Angular Momentum-Multiple Input Multiple Output) transmission technology/technique. The OAM-MIMO transmission technology is a transmission technology in which signals multiplexed by using a plurality of radio waves or electric waves of different OAM modes are transmitted from a transmitting apparatus including a plurality of transmitting antennas to a receiving apparatus including a plurality of receiving antennas. Non-Patent Literature 1 discloses an example of the communication system that employs such an OAM-MIMO transmission technology. Specifically, Non-Patent Literature 1 discloses a communication system in which signals multiplexed by using a plurality of radio waves of different OAM modes are transmitted between a transmitting apparatus including a plurality of circular array antennas (UCAs: Uniform Circular Arrays), each of which includes a plurality of antenna elements arranged at equal intervals in a circular, and a receiving apparatus including a plurality of circular array antennas.

In addition, Patent Literature 1 to Patent Literature 5 and Non-Patent Literature 2 are cited as Prior Art Documents related to the present disclosure.

PRIOR ART DOCUMENTS

Patent Literature

[Patent Literature 1] International Publication WO2019/059408 brochure;
[Patent Literature 2] JP2017-515337A;
[Patent Literature 3] JP2015-073260A;
[Patent Literature 4] JP6583292B;
[Patent Literature 5] JP5317021B; and

Non-Patent Literature

[Non-Patent Literature 1] Hirofumi Sasaki et al., "Experiment on Over-100-Gbps Wireless Transmission with OAM-MIMO Multiplexing System in 28-GHz Band", 2018 IEEE Global Communications Conference (GLOBECON), December 2018

[Non-Patent Literature 2] Masashi Hirabe et al., "40m of OAM mode and Polarization Multiplexing in E-band" on IEEE Global Communications Conference (GLOBECON 2019, December 2019.

In the communication system that employs the OAM-MIMO transmission technology, the receiving apparatus that receives a transmission signal transmitted by the transmitting apparatus as a received signal estimates the transmission signal on the basis of the received signal. Typically, the receiving apparatus estimates the transmission signal on the basis of a transmission path matrix (in other words, a channel matrix) indicating a state of a transmission path between the transmitting apparatus and the receiving apparatus, and on the basis of the received signal.

When the transmission signal is estimated in this manner, it is desired to reduce the amount of calculation (in other words, the amount of computation) required to estimate the transmission signal. Here, when a plurality of circular array antennas provided for the transmitting apparatus and a plurality of circular array antennas provided for the receiving apparatus are arranged to be axisymmetric, the transmission path matrix is a block diagonal matrix that has a large gain only in a diagonal block component. As a result, the amount of calculation required to estimate the transmission signal is reduced because the other components of the transmission path matrix other than the diagonal block component become zero. Therefore, if the plurality of circular array antennas provided for the transmitting apparatus and the plurality of circular array antennas provided for the receiving apparatus are arranged to be always axisymmetric, it is possible to improve the estimation accuracy of the transmission signal.

In reality, however, the plurality of circular array antennas provided for the transmitting apparatus and the plurality of circular array antennas provided for the receiving apparatus are not always arranged to be axisymmetric. For example, due to a shift in arrangement position of a circular array antenna caused by wind and rain, the plurality of circular array antennas provided for the transmitting apparatus and the plurality of circular array antennas provided for the receiving apparatus may not be axisymmetric. As a result, the transmission path matrix is no longer the block diagonal matrix. In addition, not only due to that the plurality of circular array antennas provided for the transmitting apparatus and the plurality of circular array antennas provided for the receiving apparatus are not axisymmetric, but also due to the other factors, the transmission path matrix may not be the block diagonal matrix. For example, due to fading caused by reflection of radio waves or the like, the transmission path matrix may not be the block diagonal matrix. Thus, a method of reducing the amount of calculation by using that the transmission path matrix is the block diagonal matrix is available only in limited scenes.

Even in a communication system in which signals multiplexed by using a plurality of radio waves of different OAM modes are transmitted from a transmitting apparatus including a single transmitting antenna to a receiving apparatus including a single receiving antenna, it is also desired to reduce the amount of calculation required to estimate the transmission signal; however, the circular array antenna provided for the transmitting apparatus and the circular array antenna provided for the receiving apparatus are not always arranged to be axisymmetric. Therefore, even in the communication system including the single transmitting antenna and the single receiving antenna, the method of reducing the amount of calculation by using that the transmission path matrix is the block diagonal matrix is available only in limited scenes.

SUMMARY

In view of the problems described above, it is therefore an example object of the present disclosure to provide a signal estimation apparatus, a signal estimation method, and a program recording medium that can solve the technical problems described above. By way of example, the example object of the present disclosure is to provide a signal estimation apparatus, a signal estimation method, and a program recording medium that are configured to reduce the amount of calculation required to estimate a transmission signal on the basis of a received signal.

A signal estimation apparatus according to an example aspect is a signal estimation apparatus configured to estimate a transmission signal x from a received signal y in a communication system, the communication system includes: a transmitting apparatus that transmits the transmission signal x by using a transmitting antenna in which M transmitting array antennas are concentrically arranged (wherein M is an integer of 1 or more), each transmitting array antenna including N transmitting antenna elements arranged at equal intervals in a circular (wherein N is an integer of 2 or more), the transmission signal including N transmission signal groups, each transmission signal group including M transmission signal components respectively transmitted by the M transmitting array antennas that are different from each other; and a receiving apparatus that receives the transmission signal x transmitted by the transmitting apparatus as the received signal y, by using a receiving antenna in which M receiving array antennas are concentrically arranged, each receiving array antenna including N receiving antenna elements arranged at equal intervals in a circular, the signal estimation apparatus is provided with a controller, the controller is configured to: perform a discrete Fourier transform process on M×N received signal components, which are included in the received signal y and which are respectively received by M×N receiving antenna elements, by a unit of N received signal components received by each of the M receiving array antennas; and estimate an estimated signal xe containing M×N estimated signal components, which are estimated values of M×N transmission signal components, on the basis of the received signal y on which the discrete Fourier transform process is performed, and when the estimated signal xe is newly estimated, the controller is configured to perform an exclusion operation of excluding an estimated value $xe^{(k)}$ of the M transmission signal components that constitute a k-th transmission signal group from the estimated signal xe newly estimated, and update the estimated value $xe^{(k)}$ on the basis of an intermediate signal $xt^{(k)}$ obtained by the exclusion operation and on the basis of the received signal y, thereby re-estimating the estimated signal xe (wherein k is a variable indicating each of integers that are greater than or equal to 0 and that are less than or equal to N−1).

A signal estimation method according to an example aspect is a signal estimation method of estimating a transmission signal x from a received signal y in a communication system, the communication system includes: a transmitting apparatus that transmits the transmission signal x by using a transmitting antenna in which M transmitting array antennas are concentrically arranged (wherein M is an integer of 1 or more), each transmitting array antenna including N transmitting antenna elements arranged at equal intervals in a circular (wherein N is an integer of 2 or more), the transmission signal including N transmission signal groups, each transmission signal group including M transmission signal components respectively transmitted by the M transmitting array antennas that are different from each other; and a receiving apparatus that receives the transmission signal x transmitted by the transmitting apparatus as the received signal y, by using a receiving antenna in which M receiving array antennas are concentrically arranged, each receiving array antenna including N receiving antenna elements arranged at equal intervals in a circular, the signal estimation method includes: performing a discrete Fourier transform process on M×N received signal components, which are included in the received signal y and which are respectively received by M×N receiving antenna elements, by a unit of N received signal components received by each of the M receiving array antennas; and estimating an estimated signal xe containing M×N estimated signal components, which are estimated values of M×N transmission signal components, on the basis of the received signal y on which the discrete Fourier transform process is performed, and when the estimated signal xe is newly estimated, the estimating includes an excluding operation of excluding an estimated value $xe^{(k)}$ of the M transmission signal components that constitute a k-th transmission signal group from the estimated signal xe newly estimated, and a updating operation of updating the estimated value $xe^{(k)}$ on the basis of an intermediate signal $xt^{(k)}$ obtained by the excluding operation and on the basis of the received signal y, thereby re-estimating the estimated signal xe (wherein k is a variable indicating each of integers that are greater than or equal to 0 and that are less than or equal to N−1).

A non-transitory program recording medium according to an example aspect is a non-transitory program recording medium on which a computer program that allows a computer to execute a signal estimation method is recorded, the signal estimation method is a method of estimating a transmission signal x from a received signal y in a communication system, the communication system includes: a transmitting apparatus that transmits the transmission signal x by using a transmitting antenna in which M transmitting array antennas are concentrically arranged (wherein M is an integer of 1 or more), each transmitting array antenna including N transmitting antenna elements arranged at equal intervals in a circular (wherein N is an integer of 2 or more), the transmission signal including N transmission signal groups, each transmission signal group including M transmission signal components respectively transmitted by the M transmitting array antennas that are different from each other; and a receiving apparatus that receives the transmission signal x transmitted by the transmitting apparatus as the received signal y, by using a receiving antenna in which M receiving array antennas are concentrically arranged, each receiving array antenna including N receiving antenna elements arranged at equal intervals in a circular, the signal estimation method includes: performing a discrete Fourier transform process on M×N received signal components, which are included in the received signal y and which are respectively received by M×N receiving antenna elements, by a unit of N received signal components received by each of the M receiving array antennas; and estimating an estimated signal xe containing M×N estimated signal components, which are estimated values of M×N transmission signal components, on the basis of the received signal y on which the discrete Fourier transform process is performed, and when the estimated signal xe is newly estimated, the estimating includes an excluding operation of excluding an estimated value $xe^{(k)}$ of the M transmission signal components that constitute a k-th transmission signal group from the estimated signal xe newly estimated, and a updating operation of updating the estimated value $xe^{(k)}$ on the basis of an intermediate signal $xt^{(k)}$ obtained by the excluding operation and on the basis of the received signal y, thereby re-estimating the estimated signal xe (wherein k is a variable indicating each of integers that are greater than or equal to 0 and that are less than or equal to N−1).

According to respective example aspects of the signal estimation apparatus, the signal estimation method, and the program recording medium described above, it is possible to reduce the amount of calculation required to estimate the transmission signal on the basis of the received signal.

BRIEF DESCRIPTION OF THE DRAWINGS

FIG. 1 is a block diagram illustrating a configuration of a communication system according to an example embodiment;

FIG. 2 is a vector illustrating a transmission signal transmitted by a transmitting apparatus;

FIG. 3 is a vector illustrating a received signal received by a receiving apparatus;

FIG. 4 is a diagram illustrating a relationship between the transmission signal and the received signal;

FIG. 5 is a diagram illustrating a transmission path matrix, which is a block diagonal matrix;

Each of FIG. 11A to FIG. 11C is a graph illustrating an example of a nonlinear function.

EXAMPLE EMBODIMENTS

Figure 6:
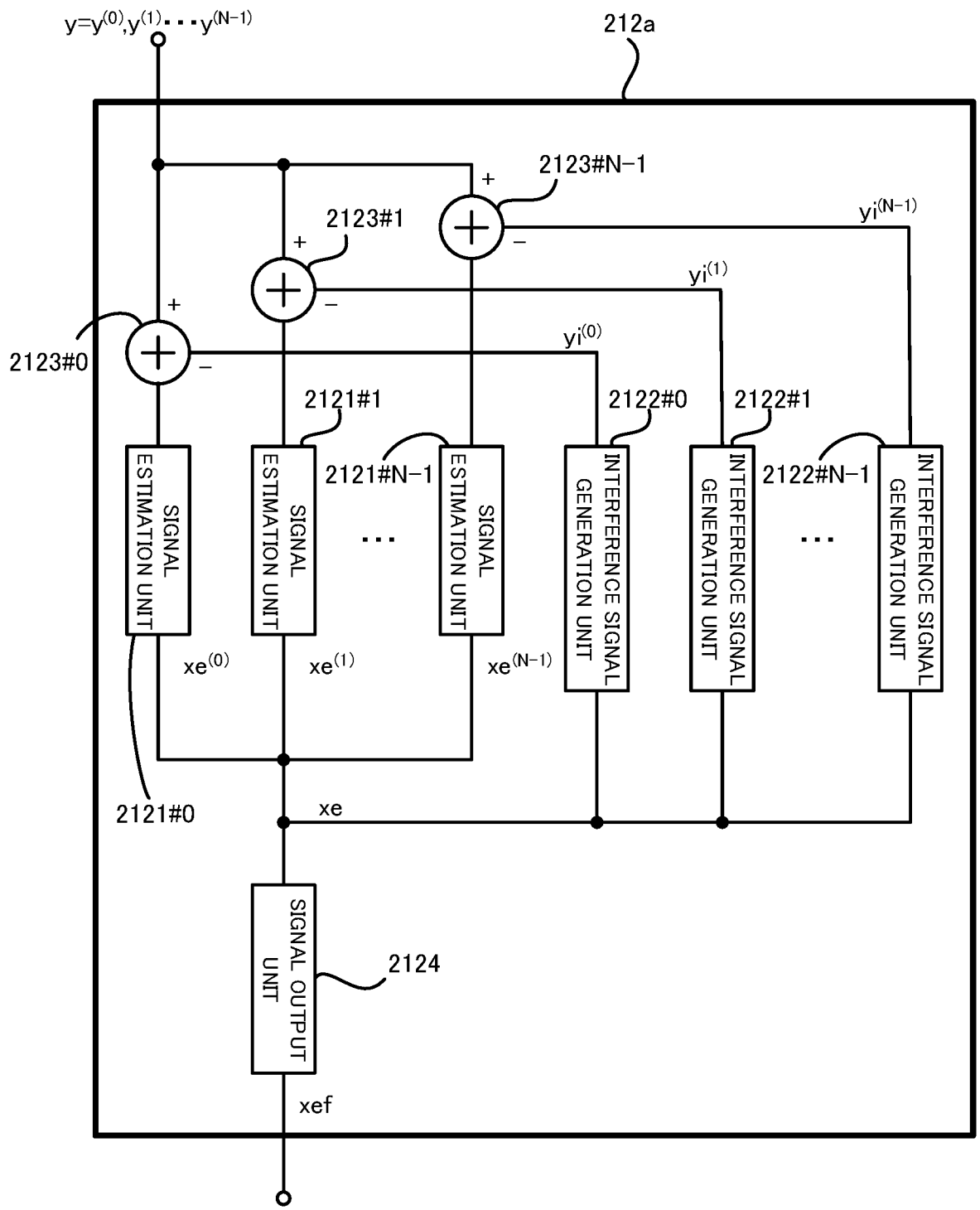
FIG. 6 is a block diagram illustrating a configuration of a first signal estimation unit.

Hereinafter, with reference to the drawings, a signal estimation apparatus, a signal estimation method, and a program recording medium according to example embodiments will be described by using a communication system SYS to which the signal estimation apparatus, the signal estimation method, and the program recording medium are applied. The present invention, however, is not limited to the example embodiments described below.

<1> Configuration of Communication System SYS

Firstly, a configuration of the communication system SYS according to an example embodiment will be described with reference to FIG. 1. FIG. 1 is a block diagram illustrating the configuration of the communication system SYS according to the example embodiment.

As illustrated in FIG. 1, the communication system SYS is provided with a transmitting apparatus 1 and a receiving apparatus 2. The transmitting apparatus 1 transmits a transmission signal x to the receiving apparatus 2 through a transmission path 3. The receiving apparatus 2 receives the transmission signal x transmitted by the transmitting apparatus 1 through the transmission path 3, as a received signal y. The transmission path 3 may include a wired transmission path (i.e., a wired communication network). The transmission path 3 may include a wireless transmission path (i.e., a wireless communication network).

The transmitting apparatus 1 transmits the transmission signal x by using an OAM (Orbital Angular Momentum) transmission technology/technique. The OAM transmission technology is a technology/technique for transmitting signals multiplexed by using a plurality of radio waves or electric waves of different OAM modes from the transmitting apparatus 1 to the receiving apparatus 2. To transmit the transmission signal x by using OAM transmission technology, the transmitting apparatus 1 is provided with a transmitting antenna 10, a signal processing apparatus 11, and a storage apparatus 12. The signal processing apparatus 11 and the storage apparatus 12 may be connected through a data bus 13.

The transmitting antenna 10 includes a plurality of circular array antennas (UCAs: Uniform Circular Arrays) 100 of differing diameters. In the following description, the transmitting antenna 10 shall include M circular array antennas 100 (specifically, circular array antennas 100#0 to 100#M−1) (wherein M is an integer of 1 or more). Incidentally, when the transmitting antenna 10 includes two or more circular array antennas 100 (and furthermore when a receiving antenna 20 described later includes two or more circular array antennas 200), the OAM transmission technology may be referred to as an OAM-MIMO (Multiple Input Multiple Output) transmission technology. The M circular array antennas 100 are arranged concentrically (i.e., coaxially). Specifically, the M circular array antennas 100 are arranged such that the circular array antennas 100#0 to 100#M−1 are arranged in this order from the center to the outside. Each circular array antenna 100 is provided with a plurality of antenna elements 101. In the example illustrated in FIG. 1, each circular array antenna 100 shall include N antenna elements 101 (specifically, antenna elements 101#0 to 101#N−1) (wherein N is an integer of 2 or more). In FIG. 1, the antenna elements 101#0 to 101#N−1 provided for a circular array antenna 100#p are respectively written as antenna elements 101#0(#p) to 101#N−1(#p) (wherein p is a variable indicating each of integers that are greater or equal to 0 and that are less than or equal to M−1).

Radio waves of different OAM modes in the same frequency band are allocated to the N antenna elements 101 provided for each circular array antenna 100. That is, in the example embodiment, the transmitting apparatus 1 multiplexes the transmission signal x by using N OAM modes. In this case, each circular array antenna 100 is allowed to transmit the transmission signal x by using the N antenna elements 101 by a unit of N transmission signal groups respectively corresponding to the N OAM modes. However, the radio waves of the same OAM mode may be allocated to at least two antenna elements 101 provided for each circular array antenna 100. That is, the number of the OAM modes may be less than the number of the antenna elements 101 provided for each circular array antenna 100.

In addition, since the transmitting antenna 10 is provided with the M circular array antennas 100, the N transmission signal groups may contain M transmission signal components. Therefore, the transmitting apparatus 1 is allowed to transmit the transmission signal (i.e., a transmission signal sequence) x containing at most M×N transmission signal components multiplexed. Hereinafter, a transmission signal component transmitted by a k-th antenna element 101#k of the circular array antenna 100#p will be referred to as a "transmission signal $x^{(k)}_{(p)}$," (wherein k is an integer that is greater than or equal to 0 and that is less than or equal to N−1). In this case, the transmission signal x can be represented by a vector illustrated in FIG. 2. In FIG. 2, a "transmission signal $x^{(k)}$" includes M transmission signals $x^{(k)}(0)$ to $x^{(k)}_{(M-1)}$ transmitted by M k-th antenna elements 101#k respectively provided for the M circular array antennas 100. That is, the "transmission signal $x^{(k)}$" corresponds to a transmission signal included in a k-th transmission signal group transmitted in the same OAM mode.

The signal processing apparatus 11 may include at least one of a CPU (Central Processing Unit), a GPU (Graphic Processing Unit) and a FPGA (Field Programmable Gate Array). The signal processing apparatus 11 may read a computer program. For example, the signal processing apparatus 11 may read a computer program stored in the storage apparatus 12. For example, the signal processing apparatus 11 may read a computer program stored in a computer-readable recording medium, by using a not-illustrated recording medium reading apparatus. The signal processing apparatus 11 may obtain (i.e., may download or read) a computer program from a not-illustrated apparatus disposed outside the transmitting apparatus 1, through a not-illustrated communication apparatus. The signal processing apparatus 11 executes the read computer program. As a result, a logical function block(s) for performing an operation to be performed by the transmitting apparatus 1 is realized in the signal processing apparatus 11. Specifically, a logical function block(s) for performing a transmission operation of transmitting the transmission signal x is realized in the signal processing apparatus 11. In other words, the signal processing apparatus 11 is configured to function as a controller for realizing the logical function block(s) for performing the operation to be performed by the transmitting apparatus 1.

FIG. 1 illustrates an example of the logical function block(s) realized in the signal processing apparatus 11 for performing the transmission operation. As illustrated in FIG. 1, M transform units 111 (specifically, transform units 111#0 to 111#M−1) are realized in the signal processing apparatus 11.

Each transform unit 111#p performs preprocessing on N transmission signals $x^{(0)}_{(p)}$ to $x^{(N-1)}_{(p)}$ transmitted by one circular array antenna 100#p corresponding to each transform unit 111#p, out of the M circular array antennas 100. In the example embodiment, each transform unit 111#p performs an inverse discrete Fourier transform (IDFT) process on the N transmission signals $x^{(0)}_{(p)}$ to $x^{(N-1)}_{(p)}$. In this case, each transform unit 111#p may include an inverse discrete Fourier transform unit of a length N. The IDFT process may be at least a part of a process for OAM-multiplexing the N transmission signals $x^{(0)}_{(p)}$ to $x^{(N-1)}_{(p)}$. That is, the signal processing apparatus 11 may OAM-multiplex the transmission signal x, which includes M×N transmission signals $x^{(k)}_{(p)}$, by dividing the transmission signal x into M signal sequences each of which includes the N transmission signals $x^{(0)}_{(p)}$ to $x^{(N-1)}_{(p)}$, and by performing the IDFT process on each of the M signal sequences. The N transmission signals $x^{(0)}_{(p)}$ to $x^{(N-1)}_{(p)}$ on which the IDFT process is performed are transmitted to the receiving apparatus 2 by the corresponding circular array antenna 100#p. In the following description, the N transmission signals $x^{(0)}_{(p)}$ to $x^{(N-1)}_{(p)}$ on which the IDFT process is performed are written as "transmission signals $x'^{(0)}_{(p)}$ to $x'^{(N-1)}_{(p)}$," thereby to distinguish them from the N transmission signals $x^{(0)}_{(p)}$ to $x^{(N-1)}_{(p)}$ on which the IDFT process is not performed.

The storage apparatus 12 is configured to store desired data. For example, the storage apparatus 12 may temporarily store a computer program to be executed by the signal processing apparatus 11. The storage apparatus 12 may temporarily store the data that are temporarily used by the signal processing apparatus 11 when the signal processing apparatus 11 executes the computer program. The storage apparatus 12 may store the data that are stored for a long term by the transmitting apparatus 1. The storage apparatus 12 may include at least one of a RAM (Random Access Memory), a ROM (Read Only Memory), a hard disk device, a magneto-optical disk device, an SSD (Solid State Drive) and a disk array device.

Next, the receiving apparatus 2 is provided with a receiving antenna 20, a signal processing apparatus 21, and a storage apparatus 22. The signal processing apparatus 21 and the storage apparatus 22 may be connected through a data bus 23.

The receiving antenna 20 is an antenna for receiving the transmission signal x transmitted by using the OAM transmission technology as the received signal y. In the example embodiment, the receiving antenna 20 includes a plurality of circular array antennas 200 of different diameters. In the following description, the receiving antenna 20 shall include M circular array antennas 200 (specifically, circular array antennas 200#0 to 200#M−1). The M circular array antennas 200 are arranged concentrically (i.e., coaxially). Specifically, the M circular array antennas 200 are arranged such that the circular array antennas 200#0 to 200#M−1 are arranged in this order from the center to the outside. Each circular array antenna 200 is provided with a plurality of antenna elements 201. In the example illustrated in FIG. 1, each circular array antenna 200 shall include N antenna elements 201 (specifically, antenna elements 201#0 to 201#N−1). In FIG. 1, the antenna elements 201#0 to 201#N−1 provided for a circular array antenna 200#p are respectively written as antenna elements 201#0(#p) to 201#N−1(#p).

The circular array antenna 200#p receives the N transmission signals $x'^{(0)}_{(p)}$ to $x'^{(N-1)}_{(p)}$ transmitted by one circular array antenna 100#p corresponding to the circular array antenna 200#p, as received signals $y^{(0)}_{(p)}$ to $y^{(N-1)}_{(p)}$, by using the N antenna elements 201#0(#p) to 201#N−1(#p). Typically, an antenna element 201#k(#p) provided for the circular array antenna 200#p receives a transmission signal $x'^{(k)}_{(p)}$ transmitted by an antenna element 101#k(#p) provided for the circular array antenna 100#p, as a received signal $y^{(k)}_{(p)}$. Therefore, the received signal y may be expressed by a vector illustrated in FIG. 3. In FIG. 3, a "received signal $y^{(k)}$" includes M received signals $y^{(k)}_{(p)}$ to $y^{(k)}_{(M-1)}$ received by M k-th antenna elements 201#k respectively provided for the M circular array antennas 200. That is, the "received signal $y^{(k)}$" corresponds to a received signal group received in the corresponding OAM mode (i.e., a received signal obtained by receiving the transmission signal $x^{(k)}$ included in the corresponding transmission signal group).

The signal processing apparatus 21 may include at least one of a CPU, a GPU, and a FPGA. The signal processing apparatus 21 reads a computer program. For example, the signal processing apparatus 21 may read a computer program stored in the storage apparatus 22. For example, the signal processing apparatus 21 may read a computer program stored in a computer-readable recording medium, by using a not-illustrated recording medium reading apparatus. The signal processing apparatus 21 may obtain (i.e., may download or read) a computer program from a not-illustrated apparatus disposed outside the receiving apparatus 2, through a not-illustrated communication apparatus. The signal processing apparatus 21 executes the read computer program. As a result, a logical function block(s) for performing an operation to be performed by the receiving apparatus 2 is realized in the signal processing apparatus 21. Specifically, a logical function block(s) for performing a reception operation of receiving the received signal y is realized in the signal processing apparatus 21. In other words, the signal processing apparatus 21 is configured to function as a controller for realizing the logical function block(s) for performing the operation to be performed by the receiving apparatus 2.

FIG. 1 illustrates an example of the logical function block(s) realized in the signal processing apparatus 21 for performing the reception operation. As illustrated in FIG. 1, M transform units 211 (specifically, transform units 211#0 to 211#M−1) and a signal estimation unit 212 are realized in the signal processing apparatus 21.

Each transform unit 211#p performs preprocessing on N received signals $y^{(0)}_{(p)}$ to $y^{(N-1)}_{(p)}$ received by one circular array antenna 200#p corresponding to each transform unit 211#p out of the M circular array antennas 200. In the example embodiment, each transform unit 211#p performs a discrete Fourier transform (DFT) process on the N received signals $y^{(0)}_{(p)}$ to $y^{(N-1)}_{(p)}$. In this case, each transform unit 211#p may include a discrete Fourier transform unit of length N. The DFT process may be at least a part of a process for separating the N received signals $y^{(0)}_{(p)}$ to $y^{(N-1)}_{(p)}$ that are OAM-multiplexed. That is, the signal processing apparatus 21 divides the received signal y including M×N received signals $y^{(k)}_{(p)}$ into M signal sequences each of which includes the N received signals $y^{(0)}_{(p)}$ to $y^{(N-1)}_{(p)}$ and performs the DFT process on each of the M signal sequences. In other words, the signal processing apparatus 21 performs the DFT process on the received signal y including the M×N received signals $y^{(k)}_{(p)}$, by a unit of M signal sequences each of which includes the N received signals $y^{(0)}_{(p)}$ to $y^{(N-1)}_{(p)}$. The received signal y on which the Fourier transform process is performed (i.e., the received signal y including the M×N received signals $y^{(k)}_{(p)}$ on which the Fourier transform process is performed) is outputted to the signal unit 212. In the following description, unless otherwise specifically noted, the "received signal y (including the received signal $y^{(k)}_{(p)}$ and the received signals $y^{(k)}_{(p)}$)" shall mean the received signal on which the Fourier transform process is performed.

The signal estimation unit 212 estimates the transmission signal x on the basis of the received signal y including the M×N received signals $y^{(k)}_{(p)}$ outputted from the M transform units 211. Specifically, the signal estimation unit 212 estimates an estimated signal x_estimate including M×N estimated signals x_estimate$^{(k)}_{(p)}$, which are estimate values of M×N transmission signals $x^{(k)}_{(p)}$ included in the transmission signal x, on the basis of the received signal y. The signal estimation unit 212 estimates the estimated signal x_estimate including N estimated signals x_estimate$^{(k)}$, which are estimated values of N transmission signals $x^{(k)}$ included in the transmission signal x, on the basis of the received signal y. In the following, the "estimated signal x_estimate" will be written as an "estimated signal xe" for ease of explanation.

Here, a relationship between the transmission signal x and the received signal y is as illustrated in FIG. 4. In FIG. 4, "H" denotes a transmission path matrix (in other words, a channel matrix) indicating a state (typically, a transmission state) of the transmission path 3 between the transmitting antenna 10 and the receiving antenna 20. The transmission path matrix H is a block matrix of MN rows and MN columns containing a matrix $H^{(i,j)}$ of M rows and M columns as an (i, j) component (wherein each of i and j is an integer that is greater than or equal to 0 and that is less than or equal to N−1). In addition, "$n^{(0)}, n^{(1)}, \ldots, n^{(N-1)}$" in FIG. 4 illustrates a vector containing noise (e.g., white noise) generated in the transmission path 3, as a component.

An example of the signal estimation method for estimating the transmission signal x on the basis of the received signal y may be a signal estimation method that employs an exhaustive search method. The signal estimation method that employs the exhaustive search method is a method of performing an arithmetic operation illustrated in FIG. 4 on each of all the signal patterns ((i.e., signal sequences) that can be taken by the transmission signal x, thereby to calculate all the signal patterns that can be taken by the received signal y, and of selecting a signal pattern of the transmission signal x corresponding to the received signal y having a signal pattern that is the closest to that of the received signal y that is actually received, as a signal pattern of the estimated signal xe. The signal estimation method that employs the exhaustive search method, however, requires a huge amount of calculation to estimate the transmission signal x.

Another example of the signal estimation method for estimating the transmission signal x on the basis of the received signal y may be a signal estimation method that employs a least squares method. The signal estimation method that employs the least squares method is a method of estimating the transmission signal x (i.e., estimating the estimated signal xe including the M × N estimated signals xe$^{(k)}_{(p)}$) by using Equation 1. Note that "H†" in Equation 1 denotes a conjugate transpose matrix of the transmission path matrix H, "σ(k)" in Equation 1 denotes a vector containing M parameters "$\sigma^{(k)}_{(0)}, \ldots, \sigma^{(k)}_{(M-1)}$" that represent SNR (Signal to Noise Ratio), and "D($\sigma^{(0)}, \ldots, \sigma^{(N-1)}$)" in Equation 1 denotes a diagonal matrix of the MN rows and MN columns containing parameters "$\sigma^{(0)}, \ldots, \sigma^{(N-1)}$" that represent the M×N SNRs, as a diagonal component.

$$xe=(xe^{(0)}, xe^{(1)}, \ldots, xe^{(N-1)})^T = (H^\dagger H + D(\sigma^{(0)}, \ldots, \sigma^{(N-1)}))^{-1} H^\dagger (y^{(0)}, \ldots, y^{(N-1)})^T \quad \text{[Equation 1]}$$

The amount of calculation required to estimate the transmission signal x by using the least squares method is less than the amount of calculation required to estimate the transmission signal x by using the exhaustive search method. However, since the transmission path matrix H has a size of MN rows and MN columns, the amount of calculation that is proportional to (MN)$^3$ including the calculation of an inverse matrix with a size of MN rows and MN columns, which has a relatively large contribution to the amount of calculation, is required in order to estimate the transmission signal x by using Equation 1. For this reason, there is still room for reduction in the amount of calculation required to estimate the transmission signal x by using the least squares method. Furthermore, the estimation accuracy of the transmission signal x by the least squares method is inferior to that of the transmission signal x by the exhaustive search method.

On the other hand, under an ideal environment in which the transmitting antenna 10 and the receiving antenna 20 are arranged to be axisymmetric (i.e., to be coaxial) and in which there is no interference due to fading or the like in the transmission path 3, the matrix Ho, J) included in the transmission path matrix H is a zero matrix under a condition of i≠j. As a result, the transmission path matrix H becomes a block diagonal matrix in which components other than a diagonal block component are zero, as illustrated in FIG. 5. In this case, the signal estimation method that employs the least squares method described above is a method of estimating the transmission signal x by using Equation 2.

$$xe^{(k)} = (H^{(k,k)\dagger} H^{(k,k)} + D(\sigma^{(k)}))^{-1} H^{(k,k)\dagger} y^{(k)} \quad \text{[Equation 2]}$$

Here, since the matrix $H^{(k,k)}$ has a size of M rows×M columns, the amount of calculation that is proportional to N×M³ including the calculation of an inverse matrix with a size of M rows×M columns, which has a relatively large contribution to the amount of calculation, is required in order to estimate the transmission signal x by using Equation 2. Therefore, the amount of calculation required to estimate the transmission signal x by using the least squares method based on Equation 2 is less than the amount of calculation required to estimate the transmission signal x by using the least squares method based on Equation 1. On the other hand, the estimation of the transmission signal x using the least squares method based on Equation 2 may be performed only in an ideal scene in which the transmitting antenna 10 and the receiving antenna 20 are arranged to be axisymmetric and in which there is no interference due to fading or the like in the transmission path 3. In reality, however, the transmitting antenna 10 and the receiving antenna 20 are not always arranged to be axisymmetric. For example, due to a shift in the arrangement position of at least a part of the transmitting antenna 10 and the receiving antenna 20 caused by wind and rain, the transmitting antenna 10 and the receiving antenna 20 may not be always axisymmetric. In addition, it is not easy to realize an environment in which there is no interference due to fading or the like in the transmission path 3 all the time. Therefore, it is likely that the transmission path matrix H is no longer the block diagonal matrix.

Thus, in the example embodiment, the signal estimation unit 212 employs a new signal estimation method as proposed below so as to estimate the transmission signal x. As a result, the signal estimation unit 212 is capable of appropriately estimating the transmission signal x with a relatively small amount of calculation even when the transmission path matrix H is not the block diagonal matrix. For example, the signal estimation unit 212 is capable of appropriately estimating the transmission signal x with the amount of calculation that is less than the amount of calculation required to estimate the transmission signal x by using least squares method based on Equation 1, when the transmission matrix H is not the block diagonal matrix. Since the signal estimation unit 212 will be described in detail later with reference to FIG. 6 and the like, a detailed description thereof will be omitted here.

Back in FIG. 1, the storage apparatus 22 is configured to store desired data. For example, the storage apparatus 22 may temporarily store a computer program to be executed by the signal processing apparatus 21. The storage apparatus 22 may temporarily store the data that are temporarily used by the signal processing apparatus 21 when the signal processing apparatus 21 executes the computer program. The storage apparatus 22 may store the data that are stored for a long term by the receiving apparatus 2. The storage apparatus 22 may include at least one of a RAM, a ROM, a hard disk device, a magneto-optical disk device, an SSD, and a disk array device.

<2> Signal Estimation Unit 212

Next, the signal estimation unit 212 will be described. In the example embodiment, the receiving apparatus 2 may use a first signal estimation unit 212a as the signal estimation unit 212. Alternatively, the receiving apparatus 2 may use a second signal estimation unit 212b, which is different in configuration and operation from the first signal unit 212a, instead of the first signal estimation unit 212a, as the signal estimation unit 212. Therefore, the first signal estimation unit 212a and the second signal estimation unit 212b will be described below in order.

<2-1> First Signal Estimation Unit 212a

Firstly, the first signal estimation unit 212a will be described.

<2-1-1> Configuration of First Signal Estimation Unit 212a

Firstly, a configuration of the first signal estimation unit 212a will be described with reference to FIG. 6. FIG. 6 is a block diagram illustrating the configuration of the first signal estimation unit 212a.

As illustrated in FIG. 6, the signal estimation unit 212a is provided with N signal estimation units 2121 (specifically, signal estimation units 2121#0 to 2121#N−1), N interference signal generation units 2122 (specifically, interference signal generation units 2122#0 to 2122#N−1), N adders 2123 (specifically, adders 2123#0 to 2123#N−1), and a signal output unit 2124. The operation of each of the signal estimation units 2121#0 to 2121#N−1, the interference signal generation units 2122#0 to 2122#N−1, the adders 2123#0 to 2123#N−1, and the signal output unit 2124 will be described in detail later with reference to FIG. 7, but an outline will be described below.

A signal estimation unit 2121#k estimates the estimated signal $xe^{(k)}$ on the basis of the received signal y and an interference signal $y\_interference^{(k)}$ described later, which will be generated by an interference signal generation unit 2122#k. As a result, estimated is the estimated signal xe including estimated signals $xe^{(0)}$ to $xe^{(N-1)}$ respectively estimated by the N signal estimation units 2121#0 to 2122#N−1. In the following, for ease of explanation, the "interference signal y_interference" will be written as an "interference signal yi".

The interference signal generation unit 2122#k generates an interference signal $yi^{(k)}$ on the basis of the estimated signal xe including the estimated signals $xe^{(0)}$ to $xe^{(N-1)}$ respectively estimated by the signal estimation units 2121#0 to 2122#N−1.

An adder 2123#k subtracts the interference signal $yi^{(k)}$ generated by the interference signal generation unit 2122#k from the received signal y. An output of the adder 2123#k (i.e., a difference between the received signal y and the interference signal $yi^{(k)}$ is outputted to the signal estimation unit 2121#k. Therefore, the signal estimation unit 2121#k estimates the estimated signal $xe^{(k)}$ on the basis of the output of the adder 2123#k (i.e., the difference between the received signal y and the interference signal $yi^{(k)}$).

The signal output unit 2124 outputs a final estimated signal xe final (hereinafter, written as a "final estimated signal xef") corresponding to a finalized estimation value of the transmission signal x, on the basis of the estimated signal xe including the estimated signals $xe^{(0)}$ to $xe^{(N-1)}$ respectively estimated by the signal estimation units 2121#0 to 2122#N−1. Therefore, the estimated signal xe including the estimated signals $xe^{(0)}$ to $xe^{(N-1)}$ respectively estimated by the signal estimation units 2121#0 to 2122#N−1 may be regarded as a provisional estimated signal.

Figure 7:
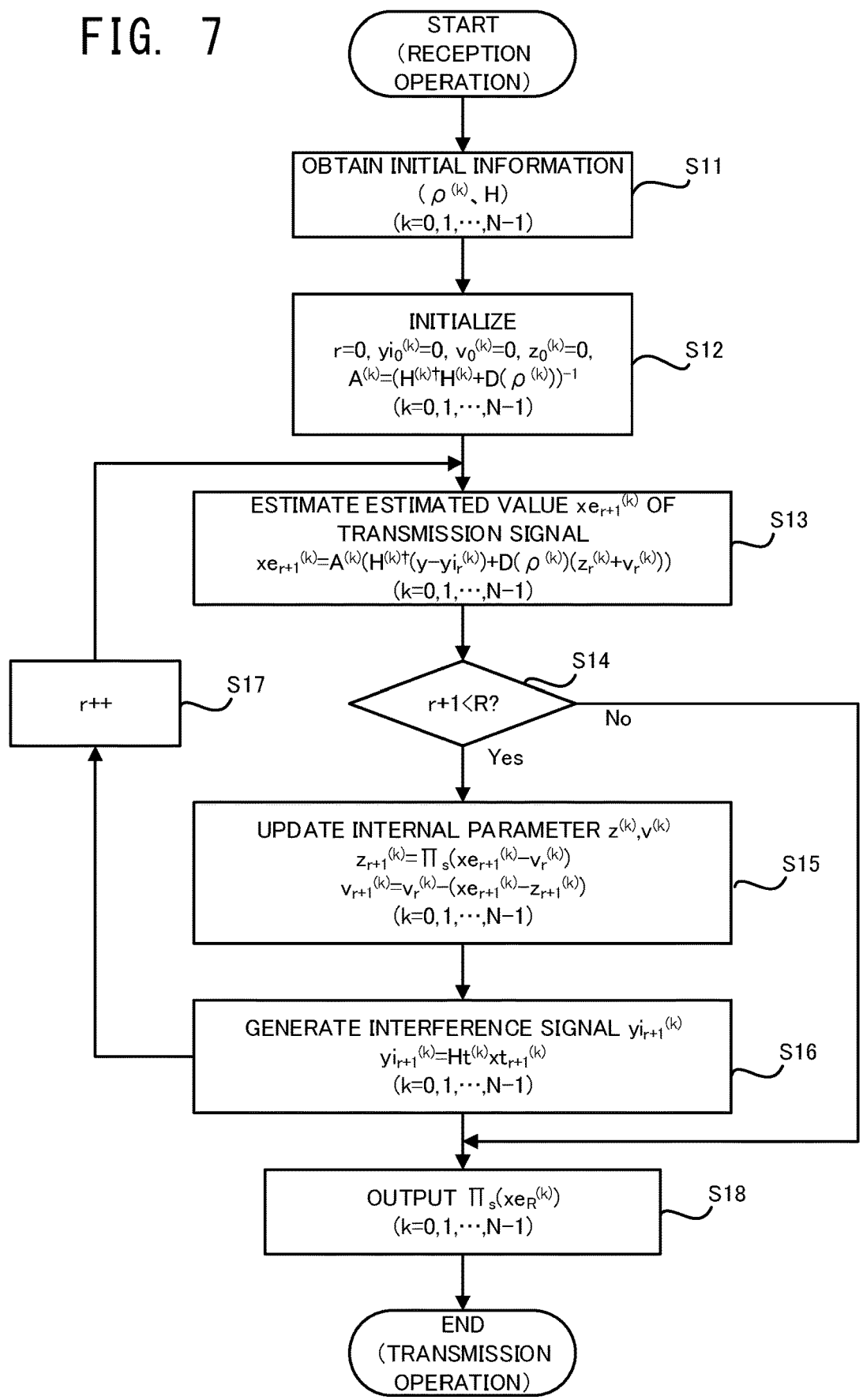
FIG. 7 is a flowchart illustrating a flow of operations in which the first signal estimation unit estimates the transmission signal.

<2-1-2> Operation of Estimating Transmission Signal x Performed by First Signal Estimation Unit 212a Next, an operation of estimating the transmission signal x performed by the first signal estimation unit 212a will be described with reference to FIG. 7. FIG. 7 is a flowchart illustrating a flow of estimation of the transmission signal x by the first signal estimation unit 212a.

The operation illustrated in FIG. 7 (except for step S18 described later) is performed in parallel by the function blocks to which a variable k with different values is assigned. That is, a function block including the signal estimation unit 2121#0, the interference signal generation unit 2122#0 and the adder 2123#0, a function block including the signal estimation unit 2121#1, the interference signal generation unit 2122#1 and the adder 2123#1, . . . , and a function block including the signal estimation unit 2121#N−1, the interference signal generation unit 2122#N−1 and the adder 2123#N−1 perform the operation illustrated in FIG. 7 in parallel.

As illustrated in FIG. 7, the signal estimation unit 2121#k obtains, as initial information, the transmission path matrix H and a parameter set $\rho^{(k)}$ including M parameters $\rho^{(k)}_{(0)}$, $\rho^{(k)}_{(1)}$, . . . , and $\rho^{(k)}_{(M-1)}$ (step S11). The parameter set $\rho^{(k)}$ is arbitrarily adjustable to set the estimation accuracy of the estimated signal $xe^{(k)}$. More specifically, the parameters $\rho^{(k)}_{(0)}, \rho^{(k)}_{(0)}, \ldots$, and $\rho^{(k)}_{(M-1)}$ included in the parameter set $\rho^{(k)}$ are arbitrarily adjustable to set the estimation accuracy of the estimated signal $xe^{(k)}_{(0)}$, $xe^{(k)}_{(1)}$, . . . , and $xe^{(k)}_{(M-1)}$, respectively.

Then, the signal estimation unit 2121#k performs an initialization operation (step S12). For example, the signal estimation unit 2121#k sets a variable r to 0. The variable r is a variable for counting the number of times that the signal estimation unit 2121#k performs an operation of estimating the estimated signal $xe^{(k)}$. This is because, as described later, the signal estimation unit 2121#k repeats the operation of estimating the estimated signal $xe^{(k)}$ as necessary. Therefore, in the following, the estimated signal $xe^{(k)}$ that the signal estimation unit 2121#k estimates at an (r+1)-th time will be written as an estimated signal $xe_{r+1}^{(k)}$. In addition, for example, the signal estimation unit 2121#k sets an initial value of the interference signal $yi^{(k)}$ to zero. In the following, for convenience of explanation, the interference signal $yi^{(k)}$ that the signal estimation unit 2121#k uses to estimate the estimated signal $xe_{r+1}^{(k)}$ will be written as an "interference signal $yi_r^{(k)}$". In this case, the initial value of the interference signal $yi^{(k)}$ is written as an "interference signal $yi_0^{(k)}$". Furthermore, for example, the signal estimation unit 2121#k sets initial values of internal data $v^{(k)}$ and $z^{(k)}$ that the signal estimation unit 2121#k uses to estimate the estimated signal $xe^{(k)}$, to zero. In the following, for convenience of explanation, the internal data $v^{(k)}$ and $z^{(k)}$ that the signal estimation unit 2121#k uses to estimate the estimated signal $xe_{r+1}^{(k)}$ will be written as "internal data $v_r^{(k)}$ and $z_r^{(k)}$". In this case, the initial values of the internal data $v^{(k)}$ and $z^{(k)}$ are written as "internal data $v_0^{(k)}$ and $z_0^{(k)}$". In addition, for example, the signal estimation unit 2121#k sets an internal (or intrinsic) matrix $A^{(k)}$ that the signal estimation unit 2121#k uses to estimate the estimated signal $xe^{(k)}$, on the basis of Equation 3. Incidentally, "$H^{(k)}$" in Equation 3 is a matrix of MN rows and M columns including a k-th column block of the transmission path matrix. Furthermore, "$D(\rho^{(k)})$" in Equation 3 denotes a diagonal matrix of M rows and M columns containing M parameters $\rho^{(k)}_{(0)}, \rho^{(k)}_{(2)}, \ldots$, and $\rho^{(k)}_{(M-1)}$ as a diagonal component.

$$A^{(k)} = (H^{(k)\dagger} H^{(k)} + D(\rho^{(k)}))^{-1} \quad \text{[Equation 3]}$$

Then, the signal estimation unit 2121#k estimates the estimated signal $xe_{r+1}^{(k)}$ on the basis of the parameter set $\rho^{(k)}$ obtained in the step S11, the transmission path matrix H obtained in the step S11, the received signal y, the interference signal $yi_r^{(k)}$, and the internal data $v_r^{(k)}$, and the internal data $z_r^{(k)}$, and the internal matrix A (k) set in the step S12 (step S13). Specifically, the signal estimation unit 2121#k uses Equation 4 to estimate the estimated signal $xe_{r+1}^{(k)}$ (step S13). Incidentally, "$y-yi_r^{(k)}$>" in FIG. 4 corresponds to the output of the adder 2123#k. When the step S13 is performed for the first time, since the variable r is initialized to zero, the signal estimation unit 2121#k estimates the estimated signal $xe_1^{(k)}$ on the basis of the interference signal $yi_0^{(k)}$ set in the step S12, the internal data $v_0^{(k)}$ set in the step S12 (k), and the internal data zoo) set in the step S12. Incidentally, the second term on the right side of Equation 4 is based on the Lagrange multiplier method, which can be used to solve a constrained optimization problem. The second term may not be necessarily used. In this case, the internal data $v_r^{(k)}$ and $z_r^{(k)}$ may also not be used.

$$xe_{r+1}^{(k)} = A^{(k)}(H^{(k)\dagger}(y - yi_r^{(k)}) + D(\rho^{(k)})(z_r^{(k)} + v_r^{(k)})) \quad \text{[Equation 4]}$$

Then, the signal estimation unit 2121#k determines whether or not the number obtained by adding 1 to the variable r is smaller than a predetermined threshold R (step S14). As described above, the variable r is a variable for counting the number of times that the signal estimation unit 2121#k performs the operation of estimating the estimated signal $xe_{r+1}^{(k)}$. Specifically, the number obtained by adding 1 to the variable r indicates the number of times that the signal estimation unit 2121#k performs the operation of estimating the estimated signal $xe_{r+1}^{(k)}$ (i.e., the number of times that the signal estimation unit 2121#k performs the step S13). Furthermore, the predetermined threshold R is a value set in advance as the number of times that the signal estimation unit 2121#k should perform the operation of estimating the estimated signal $xe_{r+1}^{(k)}$.

As a result of the determination in the step S14, when it is determined that the number obtained by adding 1 to the variable r is smaller than the predetermined threshold R (the step S14: Yes), the signal estimation unit 2121#k re-estimates the estimated signal $xe_{r+1}^{(k)}$. That is, the signal estimation unit 2121#k newly estimates an estimated signal $xe_{r+2}^{(k)}$.

In order to re-estimate the estimated signa $xe_{r+1}^{(k)}$, the signal estimation unit 2121#k updates the internal data $v_r^{(k)}$ and $z_r^{(k)}$ on the basis of the latest estimated signal $xe_{r+1}^{(k)}$ estimated in the step S13 (step S15). That is, the signal estimation unit 2121#k generates internal data $v_{r+1}^{(k)}$ and $z_{r+1}^{(k)}$ (step S15). Specifically, the signal estimation unit 2121#k generates the internal data $z_{r+1}^{(k)}$ by using Equation 5. Incidentally, the symbol "$\Pi_s(w)$" in Equation 5 is a symbol for indicating the transmission signal x with a signal pattern that has the closest distance (Euclidean distance) to that of the signal pattern of a signal w out of all the signal patterns that can be taken by the transmission signal x. Then, the signal estimation unit 2121#k generates the internal data $v_{r+1}^{(k)}$ by using Equation 6.

$$z_{r+1}^{(k)} = \Pi_s(xe_{r+1}^{(k)} - v_r^{(k)}) \quad \text{[Equation 5]}$$

$$v_{r+1}^{(k)} = v_r^{(k)} + (xe_{r+1}^{(k)} - z_{r+1}^{(k)}) \quad \text{[Equation 6]}$$

In parallel with or before and after the step S15, the interference signal generation unit 2122#k updates the interference signal $yi_r^{(k)}$ on the basis of the latest estimated signals $xe_{r+1}^{(0)}$ to $xe_{r+1}^{(N-1)}$ respectively estimated by the N signal estimation units 2121#0 to 2121#N−1 in the step S13

(step S16). That is, the interference signal generation unit 2122#k generates an interference signal $yi_{r+1}^{(k)}$ (step S16). Specifically, the interference signal generation unit 2122#k generates the interference signal $yi_{r+1}^{(k)}$ on the basis of Equation 7. That is, the interference signal generation unit 2122#k generates the interference signal $yi_{r+1}^{(k)}$ on the basis of N−1 column blocks that exclude the k-th column block corresponding to the k-th transmission signal group from the N column blocks that constitute the transmission path matrix H, and on the basis of N−1 estimated signals $xe_{r+1}^{(s)}$ that exclude the estimated signal $xe_{r+1}^{(k)}$ (wherein s is a variable indicating an integer that is greater than or equal to 0 and that is less than or equal to N−1, but is not k). Therefore, Equation 7 can be expressed by Equation 8 when a matrix including the N−1 column blocks that exclude the k-th column block from the N column blocks that constitute the transmission path matrix H is an intermediate matrix $Ht^{(k)}$, and when a signal including the N−1 estimated signals $xe_{r+1}^{(s)}$ that exclude the estimated signal $xe_{r+1}^{(k)}$ is an intermediate signal $xt_{r+1}^{(k)}$. Incidentally, the matrix $Ht^{(k)}$ is a matrix of MN rows and (MN−M) columns. Furthermore, the intermediate signal $xe_{r+1}^{(k)}$ is a vector of (MN−M) dimensions.

$$yi_{r+1}^{(k)} = \sum_{\substack{i=0 \\ i \neq k}}^{N-1} H^{(i)} xe_{r+1}^{(i)} \quad \text{[Equation 7]}$$

Then, the signal estimation unit 2121#k increments the variable r by 1 (step S17), and then re-estimates (i.e., updates) the estimated signal $xe_{r+1}^{(k)}$ (the step S13). That is, the signal estimation unit 2121#k re-estimates the estimated signal $xe_{r+1}^{(k)}$ on the basis of the parameter set $\rho^{(k)}$ obtained in the step S11, the transmission path matrix H obtained in the step S1, the received signal y, the interference signal $yi_r^{(k)}$ generated in the step S16, the internal data $v_r^{(k)}$ updated in the step S15, and the internal data $z_r^{(k)}$ updated in the step S15 (the step S13). Again, the signal estimation unit 2121#k uses Equation 4 described above to re-estimate the estimated signal $xe_{r+1}^{(k)}$.

The above operation including the step S13 to the step S17 is repeated until it is determined that the number obtained by adding 1 to the variable r is not smaller than the predetermined threshold R. That is, the operation including the step S13 to the step S17 is repeated R−1 times.

As a result of the determination in the step S14, when it is determined that the number obtained by adding 1 to the variable r is not smaller than the predetermined threshold R (the step S14: No), the signal estimation unit 2121#k may not re-estimate the estimated signal $xe_{r+1}^{(k)}$. In this case, the signal estimation unit 2121#k outputs the estimated signal $xe_{r+1}^{(k)}$ ($=xe_R^{(k)}$) estimated at the last time, to the signal output unit 2124. The signal output unit 2124 outputs the final estimated signal xef on the basis of the estimated signal xe including estimated signals $xe_R^{(0)}$ to $xe_R^{(N-1)}$ respectively estimated by the signal estimation unit 2121#0 to 2121#N−1 (step S18). Specifically, the signal output part 2124 uses Equation 9 to output a final estimated signal $xef^{(k)}$, which is a finalized estimation value of the transmission signal $x^{(k)}$ (step S18). That is, the signal output unit 2124 outputs, as the final estimated signal $xef^{(k)}$, the transmission signal $x^{(k)}$ with a signal pattern that has the closest distance (Euclidean distance) to that of the signal pattern of the estimated signal $xe_R^{(k)}$ out of all the signal patterns that can be taken by the transmission signal $x^{(k)}$. As a result, the signal output unit 2124 outputs final estimated signal xef in which final estimated signals $xef^{(0)}$ to $xef^{(N-1)}$ are arranged in appropriate order. That is, the signal output unit 2124 outputs, as the final estimated signal xef, the transmission signal x with a signal pattern that has the closest distance (Euclidean distance) to that of the signal pattern of the estimated signal xe out of all the signal patterns that can be taken by the transmission signal x.

$$xef^{(k)} = \Pi_s(xe_R^{(k)}) \quad \text{[Equation 9]}$$

<2-1-3> Technical Effects of First Signal Estimation Unit 212a

As indicated in Equation 3 and Equation 4 described above, the signal estimation unit 212a uses not only the diagonal block component of the transmission path matrix H, but also non-diagonal block components of the transmission path matrix H so as to estimate the transmission signal x (i.e., to estimate the estimated signal xe). Therefore, the signal estimation unit 212a is configured to estimate the transmission signal x even when the transmission path matrix H is not the block diagonal matrix.

Furthermore, even when the transmission path matrix H is not the block diagonal matrix, since the transmission signal $x^{(k)}$ is estimated on the basis of the difference between the received signal y and the interference signal $yi^{(k)}$ as described above, the estimation accuracy of the transmission signal $x^{(k)}$ is kept relatively high. The reason is as follows. Since the interference signal $yi^{(k)}$ is generated from the intermediate matrix $Ht^{(k)}$ that excludes the k-th column block from the transmission path matrix H, and from the N−1 estimated signal $xe_{r+1}^{(s)}$ that exclude the estimated signal $xe_{r+1}^{(k)}$, the interference signal $yi^{(k)}$ indicates information about the transmission signal components included in the received signal y other than the transmission signal $x^{(k)}$. Therefore, the difference between the received signal $y^{(k)}$ and the interference signal $yi^{(k)}$ is substantially a signal that excludes the information about the transmission signal components other than the transmission signal $x^{(k)}$ from the received signal y (i.e., an interference component). Therefore, the signal estimation unit 212a is configured to estimate the transmission signal $x^{(k)}$ on the basis of the received signal y that excludes the information about the transmission signal components other than the transmission signal $x^{(k)}$. As a result, the signal estimation unit 212a is allowed to estimate the transmission signal $x^{(k)}$ with high accuracy as compared with when the transmission signal $x^{(k)}$ is estimated on the basis of the received signal y that does not exclude the information about the transmission signal components other than the transmission signal $x^{(k)}$. Therefore, the estimation accuracy of the transmission signal x by the signal estimation unit 212a is higher than the estimation accuracy of the transmission signal x using Equation 1. In some cases, the estimation accuracy of the transmission signal x by the signal estimation unit 212a may be as high as the estimation accuracy of the transmission signal x using the exhaustive search method.

In addition, as indicated in Equation 3, since the internal matrix A(k) is a matrix of M rows and M columns, the size of an inverse matrix calculated by the signal estimation unit 212a is the same as the size of an inverse matrix calculated to estimate the transmission signal x using Equation 2 described above (i.e., to estimate the transmission signal x using the diagonal block component of the transmission path matrix H). Therefore, the amount of calculation required for the signal estimation unit 212a to estimate the transmission signal x is less than the amount of calculation required to estimate the transmission signal x using Equation 1 described above. Specifically, the amount of calculation that is proportional to $(M^3+M^2N) \times N$ so as to perform the multiplication of the matrix illustrated in Equation 3 and the calculation of the inverse matrix, and requires the amount of calculation that is proportional to $(M^2+M^2N) \times L$ so as to perform the multiplication of the matrix illustrated in Equation 4. On the other hand, in order to estimate the transmission signal x using the Equation 1 described above, the signal estimation unit 212a requires the amount of calculation that is proportional to $(MN)^3+2(MN)^2$. In a situation where M=4, N=16, and R=4, the amount of calculation required for the signal estimation unit 212a is reduced to 10% or less of the amount of calculation required to estimate the transmission signal x using Equation 1.

Under an ideal environment in which the transmitting antenna 10 and the receiving antenna 20 are arranged to be axisymmetric, if the parameter set $\rho^{(k)}$ described above is set to be the same as the SNR $\sigma^{(k)}$, then, the estimated signal $xe^{(k)}$ that the signal estimation unit 2121#k estimates at the first time is the same as the estimated signal $xe^{(k)}$ estimated by using Equation 2. Therefore, the accuracy of the estimated signal $xe^{(k)}$ that the signal estimation unit 2121#k estimates at the second time or after is relatively likely higher than the accuracy of the estimated signal $xe^{(k)}$ estimated by using Equation 2. Alternatively, if the predetermined threshold R, which indicates the number of times that the signal estimation unit 2121#k estimates the estimated signal $xe^{(k)}$, is a is set to 1, then, the amount of calculation required for the signal estimation unit 212a to estimate the transmission signal x is reduced to the amount of calculation required to estimate the transmission signal x using Equation 2.

<2-2> Second Signal Estimation Unit 212b

Next, the second signal estimation unit 212b will be described.

<2-2-1> Configuration of Second Signal Estimation Unit 212b

Figure 8:
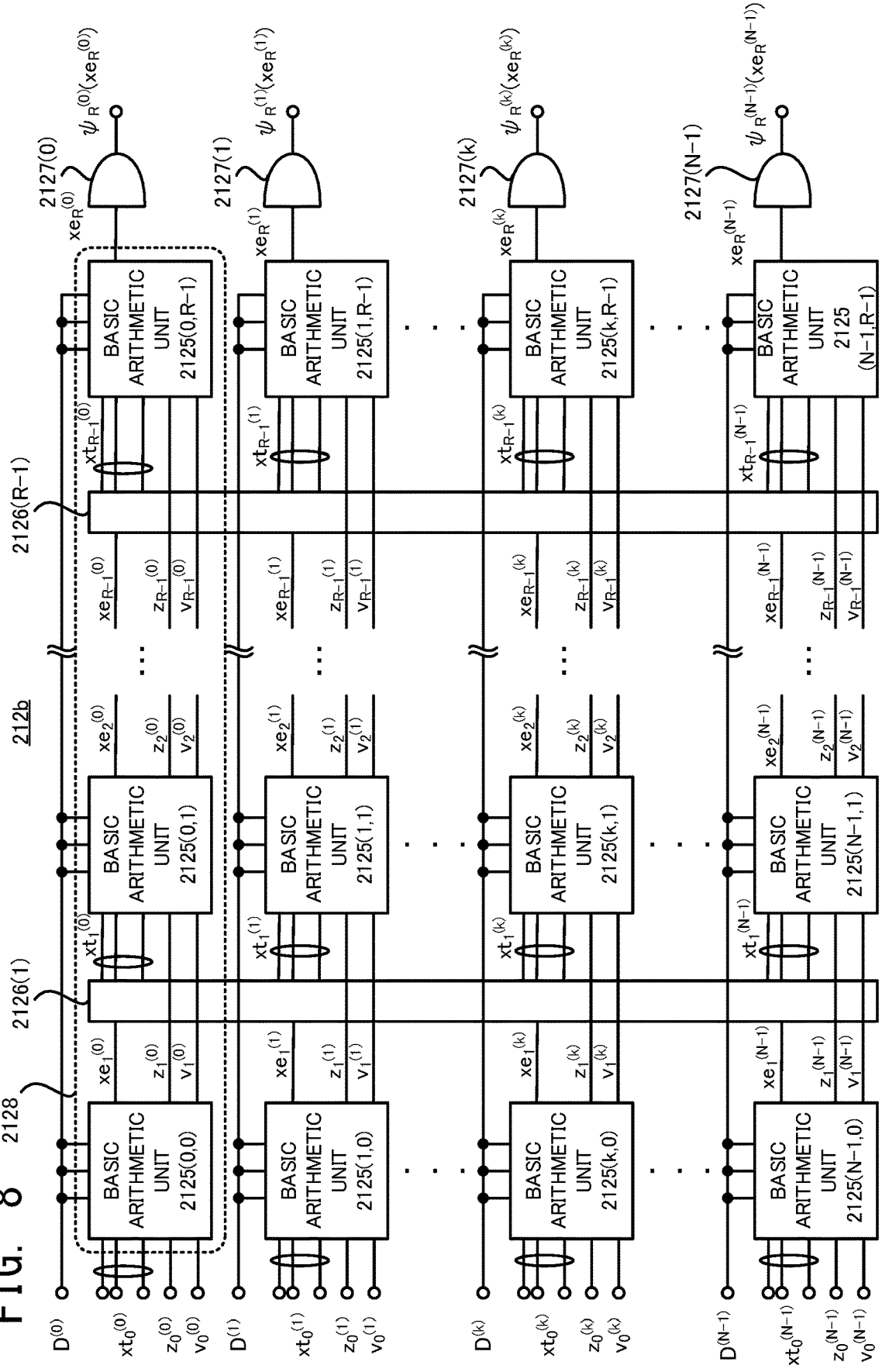
FIG. 8 is a block diagram illustrating a configuration of a second signal estimation unit.

Firstly, with reference to FIG. 8, a configuration of the second signal estimation unit 212b will be described. FIG. 8 is a block diagram illustrating the configuration of the second signal estimation unit 212b.

As illustrated in FIG. 8, the signal estimation unit 212a is provided with N×R basic arithmetic units 2125, R−1 selection output units 2126, and N signal output units 2127. The N×R basic arithmetic units 2125 are arranged in a matrix of N rows and R columns. In the example illustrated in FIG. 8, the N×R basic arithmetic units 2125 are arranged such that N arithmetic blocks 2128 are arranged in a row direction, wherein R basic arithmetic units 2125, each of which is configured to estimate the estimated signal xe, are arranged in a column direction in the arithmetic block 2128. Hereinafter, the basic arithmetic unit 2125 placed in the (k+1)-th row and in the (r+1)-th column will be written as a "basic arithmetic unit 2125(k, r)". In the first signal estimation unit 212a described above, the variable r is a variable for counting the number of times that the signal estimation unit 2121#k performs the operation of estimating the estimated signal $xe^{(k)}$, but in the second signal estimation unit 212b, it is used as a variable for indicating the arrangement position of the basic arithmetic unit 2125. Therefore, the variable r is a variable indicating each of integers that are greater than or equal to 0 and that are less than or equal to R−1. The operation of each of the basic arithmetic unit 2125, the selection output unit 2126, and the signal output unit 2127 will be described in detail later with reference to FIG. 9, but an outline will be described below.

The R basic arithmetic units 2125(k, 0) to 2125(k, R−1) arranged in the (k+1)-th row respectively estimate the estimated signals $xe_1^{(k)}$ to $xe_R^{(k)}$. That is, the basic arithmetic unit 2125(k, r) placed in the (k+1)-th row and in the (r+1)-th column estimates the estimated signal $xe_{r+1}^{(k)}$. Specifically, the basic arithmetic unit 2125(k, r) estimates the estimated signal $xe_{r+1}^{(k)}$ on the basis of an intermediate signal $xt_r^{(k)}$ including N−1 estimated signals $xe_r^{(s)}$ that exclude the estimated signal $xe_r^{(k)}$, and the internal data $v_r^{(k)}$ and $z_r^{(k)}$, and common information Dao used in common by the R basic arithmetic units 2125(k, 0) to 2125(k, R−1) arranged in the (k+1)-th row. Furthermore, the basic arithmetic unit 2125(k, r) generates the internal data $v_{r+1}^{(k)}$ and $z_{r+1}^{(k)}$.

The R−1 selection output units 2126 include selection output units 2126(1) to 2126(R−1). A selection output unit 2126(r) receives inputs that are N estimated signals $xe_r^{(k)}$ to $xe_r^{(N-1)}$ respectively estimated by N basic arithmetic units 2125(k, r−1) arranged in the r-th column. The selection output unit 2126(r) outputs the intermediate signal $xt_r^{(k)}$ including N−1 estimated signals $xe_r^{(s)}$ that exclude the estimated signal $xe_r^{(k)}$, to the basic arithmetic unit 2125(k, r).

The N signal output unit 2127 include signal output units 2127(0) to 2127(N−1). A signal output unit 2127(k) receives an input that is the estimated signal $xe_R^{(k)}$ estimated by the basic arithmetic unit 2125 (k, R−1). The signal output unit 2127(k) outputs the final estimated signal $xef^{(k)}$, which is a finalized estimation value of the transmission signal $x^{(k)}$, on the basis of the inputted estimated signal $xe_R^{(k)}$.

Figure 9:
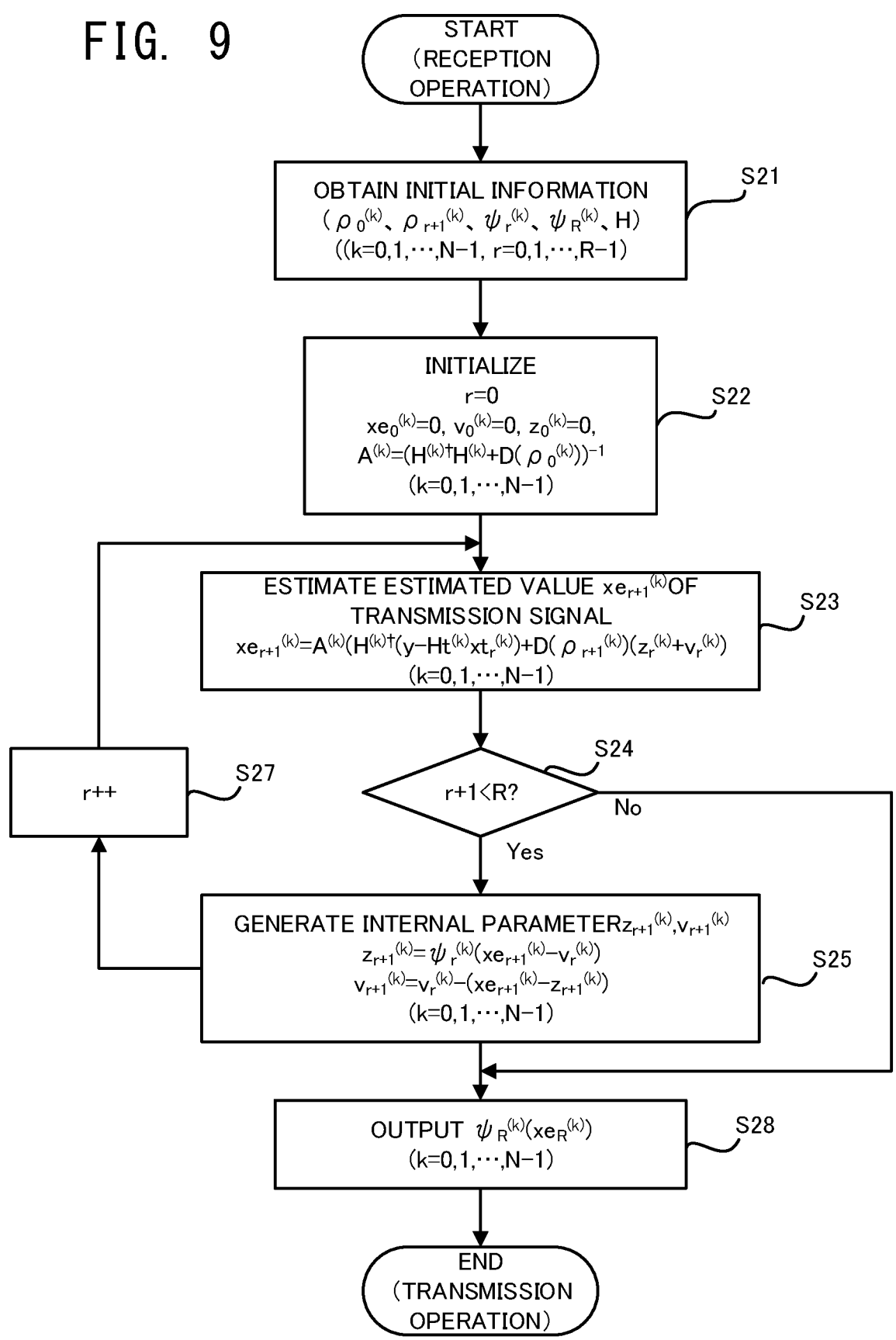
FIG. 9 is a flowchart illustrating a flow of operations in which the second signal estimation unit estimates the transmission signal.

<2-2-2> Operation of Estimating Transmission Signal x Performed by Second Signal Estimation Unit 212b Next, an operation of estimating the transmission signal x performed by the second signal estimation unit 212b will be described with reference to FIG. 9. FIG. 9 is a flowchart illustrating a flow of estimation of the transmission signal x by the second signal estimation unit 212b.

As illustrated in FIG. 9, the signal estimation unit 212b obtains the transmission path matrix H, as initial information (step S21). The obtained information about the transmission path matrix H is outputted to the basic arithmetic unit 2125(k, r) as the common information $D^{(k)}$.

Furthermore, the signal estimation unit 212b obtains, as the initial information, a parameter set $\rho_{r+1}^{(k)}$ including M parameters $\rho_{r+1}^{(k)}{}_{(0)}$, $\rho_{r+1}^{(k)}{}_{(2)}$, . . . , and $\rho_{r+1}^{(k)}{}_{(M-1)}$ (step S21). The parameter set $\rho_{r+1}^{(k)}$ is arbitrarily adjustable to set the estimation accuracy of the estimated signal $xe_{r+1}^{(k)}$. More specifically, the parameters $\rho_{r+1}^{(k)}{}_{(0)}$, $\rho_{r+1}^{(k)}{}_{(2)}$, . . . , and $\rho_{r+1}^{(k)}{}_{(M-1)}$ included in the parameter set $\rho_{r+1}^{(k)}$ are arbitrarily adjustable to set the estimation accuracy of the estimated signal $xe_{r+1}^{(k)}{}_{(0)}$, $xe_{r+1}^{(k)}{}_{(1)}$, . . . , and $xe_{r+1}^{(k)}{}_{(M-1)}$, respectively. Therefore, the parameter set $\rho_{r+1}^{(k)}$ is used by the basic arithmetic unit 2125(k, r). The signal estimation unit 212b obtains R×N parameter sets $\rho_{r+1}^{(k)}$, in accordance with the values that can be taken by the variable r and the variable k. That is, the signal estimation nit 212b obtains parameter sets $\rho_1^{(0)}$ to $\rho_R^{(N-1)}$. The obtained parameter set $\rho_{r+1}^{(k)}$ is stored in the basic arithmetic unit 2125(k, r). In addition, the signal estimation unit 212b obtains N parameter sets $\rho_0^{(k)}$ that is an initial value of each of the parameter sets $\rho_1^{(0)}$ to $\rho_R^{(N-1)}$, in accordance with the value that can be taken by the variable k. Therefore, the signal estimation unit 212b obtains (R+1)×N parameter sets p.

Furthermore, the signal estimation unit 212b obtains, as the initial information, R×N predetermined nonlinear functions $\Psi_r^{(k)}$ in accordance with the values that can be taken by the variable r and the variable k (step S21). The nonlinear function $\Psi_r^{(k)}$ is used by the basic arithmetic unit 2125(k, r)

to generate the internal data $v_{r+1}^{(k)}$ and $z_{r+1}^{(k)}$. The obtained nonlinear function $\Psi_r^{(k)}$ is stored in the basic arithmetic unit $2125(k, r)$. In addition, the signal estimation unit 212b obtains, as the initial information, N nonlinear functions $\Psi_R^{(k)}$ in accordance with the value that can be taken by the variable k (step S21). The nonlinear function $\Psi_R^{(k)}$ is used by the signal output unit 2127(k) to output the final estimated signal xef$^{(k)}$. The obtained nonlinear function $\Psi_r^{(k)}$ is stored in the signal output unit 2127(k).

Then, the signal estimation unit 212b performs an initialization operation (step S22). For example, the signal estimation unit 212b sets the variable r to 0. Furthermore, for example, the signal estimation unit 212b may set an initial value xe$_0^{(k)}$ of the estimated signal xe$^{(k)}$ to zero. That is, the signal estimation unit 212b sets initial values xe$_0^{(k)}$ to xe$_0^{(N-1)}$ of the estimated signals xe$^{(k)}$ to xe$^{(N-1)}$, to zero. In addition, for example, the signal estimation unit 212b sets the initial value $v_0^{(k)}$ of the internal data $v_r^{(k)}$ and the initial value $z_0^{(k)}$ of the internal data $z_r^{(k)}$, to zero. In other words, the signal estimation unit 212b sets initial values $v_0^{(0)}$ to $v_0^{(N-1)}$ of the internal data $v_r^{(0)}$ to $v_r^{(N-1)}$ and initial values $z_0^{(0)}$ to $z_0^{(N-1)}$ of the internal data $z_r^{(0)}$ to $z_r^{(N-1)}$, to zero. Furthermore, the signal estimation unit 212b sets the internal matrix $A^{(k)}$ that the basic arithmetic unit 2125(r,k) uses to estimate the estimated signal xe$_{r+1}^{(k)}$, on the basis of Equation 10. That is, the signal estimation unit 212b sets internal matrices $A^{(0)}$ to $A^{(N-1)}$. Information about the set internal matrix $A^{(k)}$ is outputted to the basic arithmetic unit $2125(k, r)$ as the common information $D^{(k)}$.

$$A^{(k)}=(H^{(k)\dagger}H^{(k)}+D(\rho_0^{(k)}))^{-1}$$ [Equation 10]

Then, the basic arithmetic unit $2125(k, r)$ estimates the estimated signal xe$_{r+1}^{(k)}$ on the basis of the parameter set $\rho_{r+1}^{(k)}$ obtained in the step S21, the transmission path matrix H obtained in the step S11, the received signal y, the intermediate signal xt$_r^{(k)}$ generated from the estimated signal xe$_r^{(k)}$, the internal data $v_r^{(k)}$, and the internal data $z_r^{(k)}$, and the internal matrix $A^{(k)}$ set in the step S22 (step S23). Specifically, the basic arithmetic unit $2125(k, r)$ estimates the estimated signal xe$_{r+1}^{(k)}$ by using Equation 11 (step S23). When the step S23 is performed for the first time, since the variable r is initialized to zero, the basic arithmetic unit $2125(k, 0)$ estimates the estimated signal xe$_1^{(k)}$ on the basis of the estimated signal xe$_0^{(k)}$ set in the step S22, the internal data $v_0^{(k)}$ set in the step S22, and the internal data $z_0^{(k)}$ set in the step S22. Furthermore, information about the received signal y may be outputted to the basic arithmetic unit $2125(k, r)$ as the common information $D^{(k)}$. Incidentally, the second term on the right side of Equation 11 is based on the Lagrange multiplier method, which can be used to solve a constrained optimization problem. The second term may not be necessarily used. In this case, the internal data $v_r^{(k)}$ and $z_r^{(k)}$ may also not be used.

$$xe_{r+1}^{(k)}=A^{(k)}(H^{(k)\dagger}(y-Ht^{(k)}xt_{r+1}^{(k)})+D(\rho_{r+1}^{(k)})(z_r^{(k)}+v_r^{(k)}))$$ [Equation 11]

Figure 10:
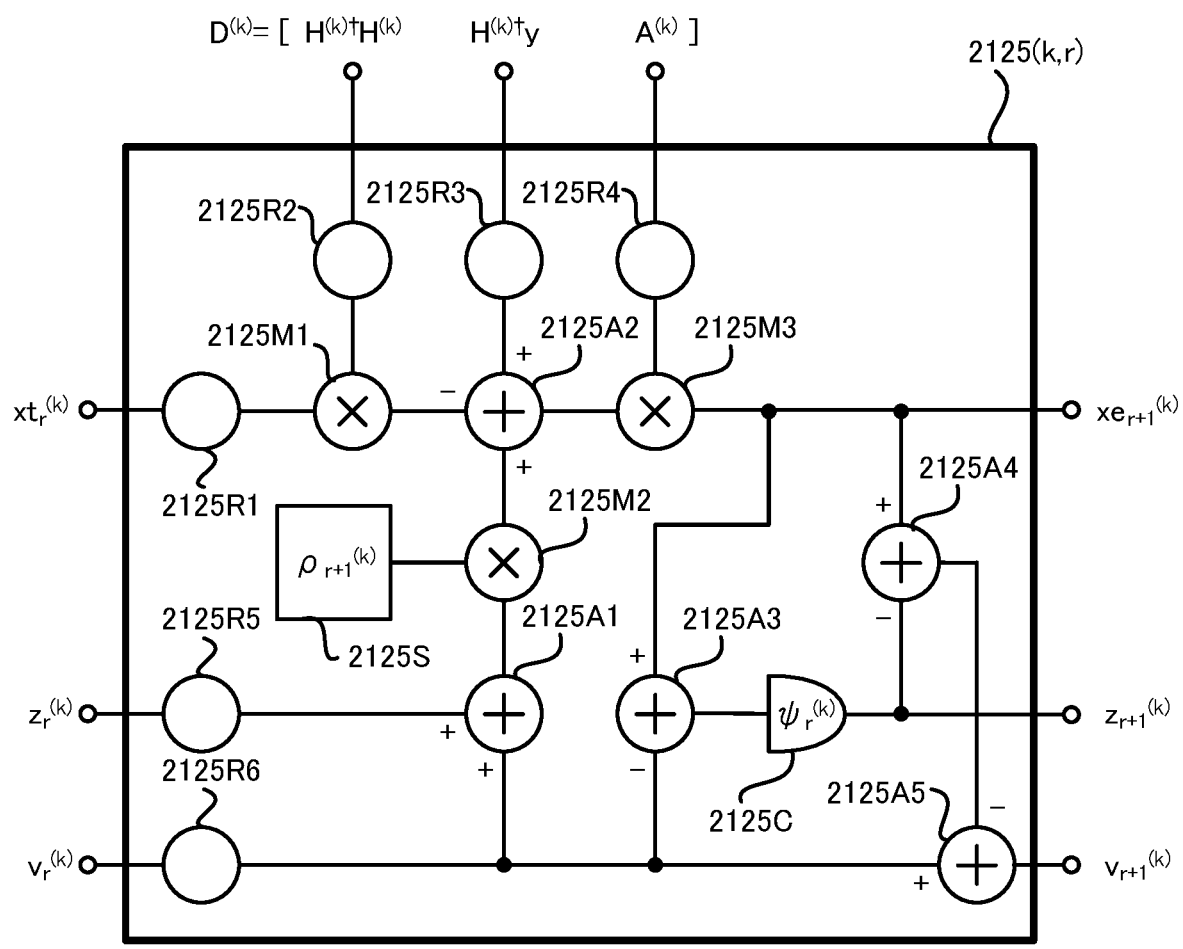
FIG. 10 is a block diagram illustrating an example of a configuration of a basic arithmetic unit.

FIG. 10 illustrates an example of a configuration of the basic arithmetic unit $2125(k, r)$ that estimates the estimated signal xe$_{r+1}^{(k)}$ on the basis of Equation 11. As illustrated in FIG. 10, as processing blocks for estimating the estimated signal xe$_{r+1}^{(k)}$, the basic arithmetic unit $2125(k, r)$ is provided with a storage apparatus 2125S, a register 2125R1, a register 2125R2, a register 2125R3, a register 2125R4, a register 2125R5, a register 2125R6, a multiplier 2125M1, a multiplier 2125M2, a multiplier 2125M3, an adder 2125A1, and an adder 2125A2. The storage apparatus 2125S stores the parameter set $\rho_{r+1}^{(k)}$. The register 2125R1 receives an input that is the intermediate signal xt$_r^{(k)}$. The register 2125R1 is configured to temporarily hold the inputted intermediate signal xt$_r^{(k)}$. The register 2125R2 receives an input that is a matrix "$H^{(k)\dagger}H^{(k)}$" as the information about the transmission path matrix H included in the common information $D^{(k)}$. The register 2125R2 is configured to temporarily hold the inputted matrix "$H^{(k)\dagger}H^{(k)}$". The register 2125R3 receives an input that is a matrix "$H^{(k)\dagger}y$" as the information about the transmission path matrix H included in the common information $D^{(k)}$. The register 2125R3 is configured to temporarily hold the inputted matrix "$H^{(k)\dagger}y$". The register 2125R4 receives an input that is internal matrix $A^{(k)}$ as information included in the common information $D^{(k)}$. The register 2125R4 is configured to temporarily hold the inputted internal matrix $A^{(k)}$. The register 2125R5 receives an input that is the internal data $z_r^{(k)}$. The register 2125R5 is configured to temporarily hold the inputted internal data $z_r^{(k)}$. The register 2125R6 receives an input that is the internal data $v_r^{(k)}$. The register 2125R6 is configured to temporarily hold the inputted internal data $v_r^{(k)}$. The multiplier 2125M1 performs a multiplication process of multiplying the intermediate signal xt$_r^{(k)}$ inputted to the register 2125R1 by the matrix "$H^{(k)\dagger}H^{(k)}$" inputted to the register 2125R2. The adder 2125A1 performs an addition process of adding the internal data $z_r^{(k)}$ inputted to the register 2125R5 and the internal data $v_r^{(k)}$ inputted to the register 2125R6. The multiplier 2125M2 performs a multiplication process of multiplying the parameter set $\rho_{r+1}^{(k)}$ stored in the storage apparatus 2125S by an output of the adder 2125A1. The adder 2125A2 performs a subtraction process of subtracting an output of the multiplier 2125M1 from an addition result of the matrix "$H^{(k)\dagger}y$" inputted to the register 2125R3 and an output of the multiplier 2125M2. The multiplier 2125M3 performs a multiplication process of multiplying the internal matrix $A^{(k)}$ inputted to the register 2125R3 by an output of the adder 2125A2. An output of the multiplier 2125M3 corresponds to the estimated signal xe$_{r+1}^{(k)}$.

The basic arithmetic unit $2125(k, r)$ is further provided with an adder 2125A3, an adder 2125A4, an adder 2125A5, and a calculator 2125C. Since these processing blocks are mainly used to generate the internal data $v_{r+1}^{(k)}$ and $z_{r+1}^{(k)}$, they will be described in detail later.

Then, the signal estimation unit 212b determines whether or not the number obtained by adding 1 to the variable r is smaller than the predetermined threshold R, (step S24). The variable r specifies the basic arithmetic unit $2125(k, r)$ that estimates the estimated signal xe$_{r+1}^{(k)}$ in each arithmetic block 2128. Therefore, it can be said that the operation of determining whether or not the number obtained by adding 1 to the variable r is smaller than the predetermined threshold R is substantially equivalent to an operation of determining whether or not the basic arithmetic unit $2125(k, R-1)$ placed in the final column of each arithmetic block 2128 estimates the estimated signal xe$_R^{(k)}$.

As a result of the determination in the step S24, when it is determined that the number obtained by adding 1 to the variable r is smaller than the predetermined threshold R (the step S24: Yes), the basic arithmetic unit $2125(k, r+1)$, which is placed in the next column of the basic arithmetic unit $2125(k, r)$ that estimates the estimated signal xe$_{r+1}^{(k)}$, estimates the estimated signal xe$_{r+2}^{(k)}$.

In this case, the basic arithmetic unit $2125(k, r)$ generates the internal data $v_{r+1}^{(k)}$ and $z_{r+1}^{(k)}$ on the basis of the latest estimated signal xe$_{r+1}^{(k)}$ estimated in the step S23 (step S25). Specifically, the basic arithmetic unit $2125(k, r)$ generates the internal data $z_{r+1}^{(k)}$ by using Equation 12. Then, the basic computing unit 2125($k$, $r$) generates the internal data $v_{r+1}^{(k)}$ by using equation 13.

$$z_{r+1}^{(k)} = \Psi_r^{(k)}(xe_{r+1}^{(k)} - v_r^{(k)}) \quad \text{[Equation 12]}$$

$$v_{r+1}^{(k)} = v_r^{(k)} - (xe_{r+1}^{(k)} - z_{r+1}^{(k)}) \quad \text{[Equation 13]}$$

Figure 11A:
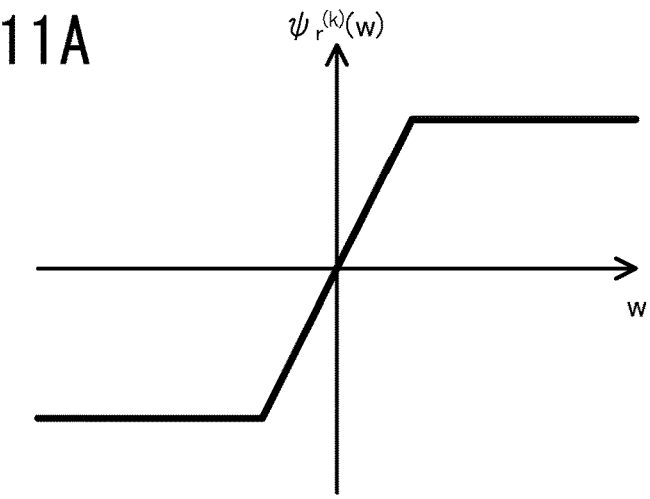
Figure 11B:
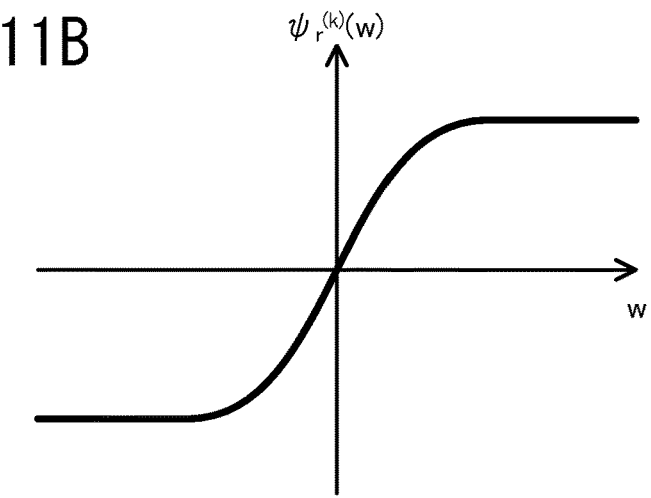
Figure 11C:
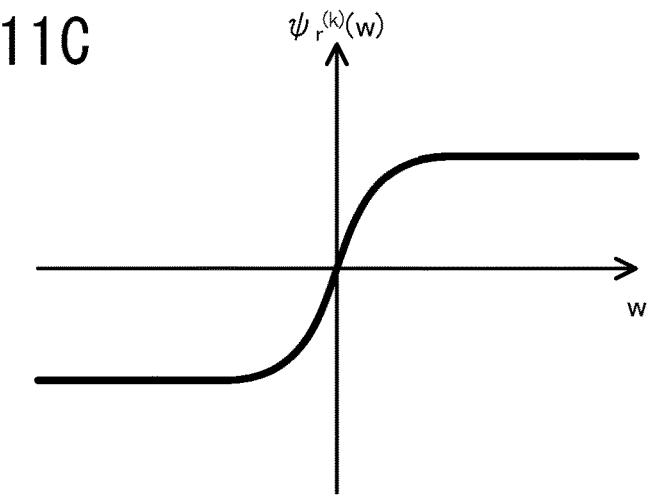

Incidentally, "$\Psi(w)$" in Equation 12 means that a nonlinear transformation process is performed on a signal (=vector) $w$ containing $M$ signal components. An example of the nonlinear function $\Psi_r(k)$ is illustrated in Equation 14. The nonlinear function $\Psi_r^{(k)}$ illustrated in Equation 14 defines the nonlinear transformation process that is performed on the $M$ signal components ($w_0$, $w_1$, ..., $w_{M-1}$) contained in the signal $w$ by using a hyperbolic tangent tanh defined by parameters ($a_0$, $a_1$, ..., $a_{M-1}$) and ($b_0$, $b_1$, ..., $b_{M-1}$). Each of FIG. 11A to FIG. 11C illustrates an example of the nonlinear function $\Psi_r^{(k)}$ illustrated in Equation 14. The nonlinear function $\Psi_r^{(k)}$ illustrated in FIG. 11A, the nonlinear function $\Psi_r^{(k)}$ illustrated in FIG. 11B, and the nonlinear function $\Psi_r^{(k)}$ illustrated in FIG. 11C differ in at least some of the parameters ($a_0$, $a_1$, ..., $a_{M-1}$) and ($b_0$, $b_1$, ..., $b_{M-1}$).

$$\Psi_r^{(k)}(w) = \left(a_0 \tanh\left(\frac{w_0}{b_0}\right), a_1 \tanh\left(\frac{w_1}{b_1}\right), \ldots a_{M-1}\tanh\left(\frac{w_{M-1}}{b_{M-1}}\right)\right) \quad \text{[Equation 14]}$$

FIG. 10 illustrates an example of a configuration of the basic arithmetic unit 2125($k$, $r$) that generates the internal data $z_{r+1}^{(k)}$ and $v_{r+1}^{(k)}$ on the basis of Equation 12 and Equation 13. As illustrated in FIG. 10, as processing blocks for generating the internal data $z_{r+1}^{(k)}$ and $v_{r+1}^{(k)}$, the basic arithmetic unit 2125($k$, $r$) is provided with the adder 2125A3, the adder 2125A4, the adder 2125A5, and the calculator 2125C. The adder 2125A3 performs a subtraction process of subtracting the internal data $v_r^{(k)}$ inputted to the register 2125R6 from the output of the multiplier 2125M3. The calculator 2125C performs a nonlinear transformation process on an output of the adder 2125A3 by using the nonlinear function $\psi_r^{(k)}$. An output of the arithmetic unit 2125C corresponds to the internal data $z_{r+1}^{(k)}$. The adder 2125A4 performs a subtraction process of subtracting the output of the calculator 2125C from the output of the multiplier 2125M3. The adder 2125A5 performs a subtraction process of subtracting an output of the adder 2125A4 from the internal data $v_r^{(k)}$ inputted to the register 2125R6. An output of the adder 2125A5 corresponds to the internal data $v_{r+1}^{(k)}$.

Then, the variable $r$ is incremented by 1 (step S27), and then, the basic arithmetic unit 2125($k$, $r$) in the next column newly estimates the estimated signal $xe_{r+1}^{(k)}$ (step S23). That is, the basic arithmetic unit 2125($k$, $r$) estimates the estimated signal $xe_{r+1}^{(k)}$ on the basis of the parameter set $\rho_r^{(k)}$ obtained in the step S21, the transmission path matrix $H$ obtained in the step S21, the received signal $y$, the internal data $v_r^{(k)}$ generated in the step S25, the internal data $z_r^{(k)}$ generated in the step S25, and the intermediate signal $xt_r^{(k)}$ outputted from the selection output unit 2126($r$) (step S23). Even in this case, the signal estimation unit 2121#$k$ re-estimates the estimated signal $xe_{r+1}^{(k)}$ by using Equation 11 described above.

The above operation including the step S23 to the step S27 is repeated until it is determined that the number obtained by adding 1 to the variable $r$ is not smaller than the predetermined threshold value R. That is, the operation including the step S23 to the step S27 is repeated R−1 times. In practice, however, as can be seen from the actual configuration of the signal estimation unit 212b illustrated in FIG. 8, the R basic arithmetic units 2125($k$, 0) to 2125($k$, R−1) included in each arithmetic block 2128 sequentially perform a process of estimating the estimated signal $xe_{r+1}^{(k)}$. That is, it can be said that the second signal estimation unit 212b is different from the first signal estimation unit 212a in that the process of estimating the estimated signal $xe_{r+1}^{(k)}$ is a pipeline process realized by the basic arithmetic units 2125($k$, 0) to 2125($k$, R−1), whereas the process of estimating the estimated signal $xe_{r+1}^{(k)}$ is a loop process in the first signal estimation unit 212a. Incidentally, for clarity of explanation, FIG. 9 illustrates the process of estimating the estimated signal $xe_{r+1}^{(k)}$ performed by the second signal estimation unit 212b, in a form of the loop process. In practice, however, the signal estimation unit 212b may not perform the process of estimating the estimated signal $xe_{r+1}^{(k)}$ in the loop process. That is, the signal estimation unit 212b may allow the basic arithmetic unit 2125($k$, 0) to 2125($k$, R−1) to sequentially perform the process of estimating the estimated signal $xe_{r+1}^{(k)}$ without performing the determination in the step S24 based on the variable $r$.

On the other hand, as a result of the determination in the step S24, when it is determined that the number obtained by adding 1 to the variable $r$ is not smaller than the predetermined threshold R (the step S24: No), it is considered that the basic arithmetic unit 2125 ($k$, R−1) in the final column of each arithmetic block 2128 has already estimated the estimated signal $xe_R^{(k)}$. In this case, the signal output unit 2127 ($k$) uses Equation 15 to output the final estimated signal xef), which is the finalized estimation value of the transmission signal $x^{(k)}$ (step S28). As a result, the final estimated signal xef including the final estimated signals $xef^{(k)}$ to $xef^{(N-1)}$ respectively outputted from the N signal output units 2127(0) to 2127(N−1) is outputted from the signal estimation unit 212b.

$$xef^{(k)} = \Psi_R^{(k)}(xe_R^{(k)}) \quad \text{[Equation 15]}$$

<2-2-3> Technical Effects of Second Signal Estimation Unit 212b

The signal estimation unit 212b can enjoy the same effects as those that the signal estimation unit 212a can receive. For example, the signal estimation unit 212a is configured to estimate the transmission signal $x$ even when the transmission path matrix $H$ is not the block diagonal matrix. Furthermore, since the transmission signal $x^{(k)}$ is estimated on the basis of a difference between a multiplication result of the intermediate signal $xt_r^{(k)}$ and the intermediate matrix $Ht^{(k)}$ (i.e., a signal corresponding to the interference signal $yi_r^{(k)}$) and the received signal $y^{(k)}$, the estimation accuracy of the transmission signal $x^{(k)}$ by the signal estimation unit 212b is kept relatively high, as in the case of the signal estimation unit 212a. In addition, the amount of calculation required for the signal estimation unit 212b to estimate the transmission signal $x$ is less than the amount of calculation required to estimate the transmission signal $x$ by using Equation 1 described above.

<4> Modified Example

Figure 12:
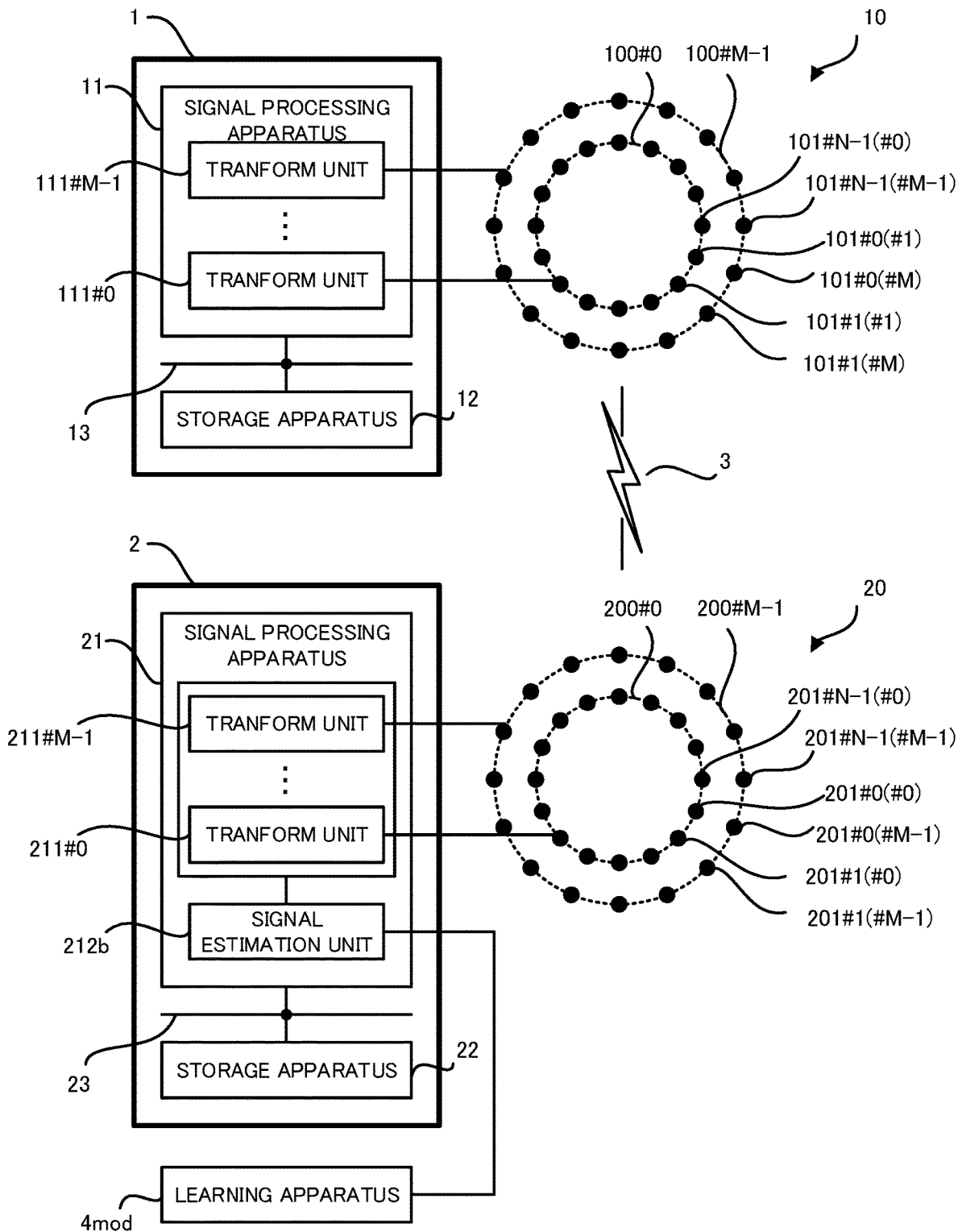
FIG. 12 is a block diagram illustrating a configuration of a communication system according to a modified example.

When the signal estimation unit 212 is the second signal estimation unit 212b, the communication system SYS may be configured to learn at least a part of the parameter set $\rho_{r+1}^{(k)}$ and the nonlinear function $\Psi_r^{(k)}$ used by the signal estimation unit 212b (e.g., the parameters ($a_0$, $a_1$, ..., $a_{M-1}$) and ($b_0$, $b_1$, ..., $b_{M-1}$) that define the nonlinear function $\Psi_r^{(k)}$). For example, as illustrated in FIG. 12 illustrating a modified example of the communication system SYS (hereinafter referred to as a "communication system SYSmod"), the communication system SYSmod may include a learning device 4mod that is configured to learn at least a part of the parameter set $\rho_{r+1}^{(k)}$ and the nonlinear function $\Psi_r^{(k)}$. The learning device 4mod may be disposed outside the receiving apparatus 2 or may be disposed inside the receiving apparatus 2. The learning device 4mod may be a processing block realized in the signal processing apparatus 21 of the receiving apparatus 2.

The learning device 4mod may learn the parameter set $\rho_{r+1}^{(k)}$ and the nonlinear function $\Psi_r^{(k)}$ by using a loss function Loss based on an error (e.g., a square error) between the final estimated signal xef outputted by the signal estimation unit 212 and the transmission signal x actually transmitted by the transmitting apparatus 1. At this time, the learning device 4mod may use a back propagation method, which is used to learn parameters of a neural network, to learn the parameter set $\rho_{r+1}^{(k)}$ and the nonlinear function $\Psi_r^{(k)}$. Equation 16 illustrates an example of the loss function Loss based on the square error between the final estimated signal xef and the transmission signal x for learning the parameter set $\rho_{r+1}^{(k)}$ and the nonlinear function $\Psi_R^{(k)}$ by using the back propagation method. Incidentally, "B" in Equation 16 denotes a set of the transmission signal x used to learn the parameter set $\rho_{r+1}^{(k)}$ and the nonlinear function $\Psi_R^{(k)}$ (i.e., a set of teacher data).

$$\text{Loss} = \sum_{x \in B} \sum_{k=0}^{N-1} \left\| x^{(k)} - \Psi_R^{(k)} x e_R^{(k)} \right\|^2 \qquad \text{[Equation 16]}$$

The effect of a learning target (for example, at least one of the parameter set $\rho_{r+1}^{(k)}$ and the nonlinear function $\Psi_R^{(k)}$) on the loss function Loss calculated by Equation 16 can be expressed by partial derivatives that can be calculated by the back propagation method. Therefore, the learning device 4mod may learn the learning target by using Equation 17. Equation 17 illustrates an example in which the learning target is the parameter set $\rho_{r+1}^{(k)}$, wherein "ε" in Equation 17 denotes a hyper parameter that can be arbitrarily set.

$$\rho_{r+1}^{(k)} = \rho_{r+1}^{(k)} - \varepsilon \frac{\partial \text{Loss}}{\partial \rho_{r+1}^{(k)}} \qquad \text{[Equation 17]}$$

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is not limited to the above-described examples and is allowed to be changed, if desired, without departing from the essence or spirit of the invention which can be read from the claims and the entire specification. A signal estimation apparatus, a signal estimation method, a computer program, a computer program product and a program recording medium, which involve such changes, are also intended to be within the technical scope of the present invention.

DESCRIPTION OF REFERENCE NUMERALS

1 Transmitting apparatus
11 Signal processing apparatus
2 Receiving apparatus
21 Signal processing apparatus
211 Transform unit
212 Signal estimation unit
SYS Communication system
x Transmission signal
y Received signal

What is claimed is:

1. A signal estimation apparatus that estimates a transmission signal x from a received signal y in a communication system,
the communication system including:
a transmitting apparatus that transmits the transmission signal x by using a transmitting antenna in which M transmitting array antennas are concentrically arranged (wherein M is an integer of 1 or more), each transmitting array antenna including N transmitting antenna elements arranged at equal intervals in a circular (wherein N is an integer of 2 or more), the transmission signal including N transmission signal groups, each transmission signal group including M transmission signal components respectively transmitted by the M transmitting array antennas that are different from each other; and
a receiving apparatus that receives the transmission signal x transmitted by the transmitting apparatus as the received signal y, by using a receiving antenna in which M receiving array antennas are concentrically arranged, each receiving array antenna including N receiving antenna elements arranged at equal intervals in a circular,
the signal estimation apparatus comprising a controller,
the controller being configured to:
perform a discrete Fourier transform process on M×N received signal components, which are included in the received signal y and which are respectively received by M×N receiving antenna elements, by a unit of N received signal components received by each of the M receiving array antennas; and
estimate an estimated signal xe containing M×N estimated signal components, which are estimated values of M×N transmission signal components, on the basis of the received signal y on which the discrete Fourier transform process is performed, and
when the estimated signal xe is newly estimated, the controller being configured to perform an exclusion operation of excluding an estimated value xe$^{(k)}$ of the M transmission signal components that constitute a k-th transmission signal group from the estimated signal xe newly estimated, and update the estimated value xe$^{(k)}$ on the basis of an intermediate signal xt$^{(k)}$ obtained by the exclusion operation and on the basis of the received signal y, thereby re-estimating the estimated signal xe (wherein k is a variable indicating each of integers that are greater than or equal to 0 and that are less than or equal to N−1).

2. The signal estimation apparatus according to claim 1, wherein
when the estimated signal xe is newly estimated, the controller is configured to generate an interference signal yi$^{(k)}$ by multiplying the intermediate signal xt$^{(k)}$ and an intermediate matrix Ht$^{(k)}$ that excludes a component H$^{(k)}$ corresponding to the k-th transmission signal group from a transmission path matrix H indicating a state of a transmission path between the receiving antenna and the transmitting antenna, and update the estimated value xe$^{(k)}$ on the basis of a difference between the received signal y and the interference signal $yi^{(k)}$, thereby re-estimating the estimated value xe.

3. The signal estimation apparatus according to claim 2, wherein
the controller is configured to have, as a logical function block, N interference signal generator, each of which generates the interference signal $yi^{(k)}$ by multiplying the intermediate signal $xt^{(k)}$ and the intermediate matrix $Ht^{(k)}$, in accordance with the variable k, and
the controller is configured to have, as a logical function block, N updating units, each of which updates the estimated value $xe^{(k)}$ on the basis of the difference between the received signal y and the interference signal $yi^{(k)}$ that is generated by corresponding one of the N interference signal generator, in accordance with the variable k.

4. The signal estimation apparatus according to claim 2, wherein
the controller is configured to perform a first operation of generating an internal matrix $A^{(k)}$ that is used to generate the estimated value $xe^{(k)}$, on the basis of the transmission path matrix H and a parameter set $\rho^{(k)}$ that includes M parameters and that corresponds to the k-th transmission signal group, and of initializing the interference signal $yi^{(k)}$ and internal data $v^{(k)}$ and $z^{(k)}$ that are used to estimate the estimated value $xe^{(k)}$,
after performing the first operation, the controller is configured to perform a second operation of estimating the estimated signal xe by generating the estimated value $xe^{(k)}$ on the basis of the parameter set $\rho^{(k)}$, the received signal y, the transmission path matrix H, the internal matrix $A^{(k)}$, the initialized interference signal $yi^{(k)}$, and the initialized internal data $v^{(k)}$ and $z^{(k)}$,
after performing the second operation, the controller is configured to perform a third operation at each time when the estimated signal xe is newly estimated, the third operation includes: (i) a first process of updating the internal data $v^{(k)}$ and $z^{(k)}$ on the basis of the estimated signal xe newly generated; (ii) a second operation of newly generating the interference signal $yi^{(k)}$ on the basis of the intermediate matrix $Ht^{(k)}$ and the intermediate signal $xt^{(k)}$ obtained from the estimated signal xe newly generated; and (iii) a third process of re-estimating the estimated signal xe by updating the estimated value $xe^{(k)}$ on the basis of the parameter set $\rho^{(k)}$, the received signal y, the transmission path matrix H, the internal matrix $A^{(k)}$, the updated internal data $v^{(k)}$ and $z^{(k)}$, and the interference signal $yi^{(k)}$ newly generated, and
after repeating the third operation a predetermined number of times, the controller is configured to output one signal sequence candidate that is the closest to the estimated value $xe^{(k)}$ out of a plurality of signal sequence candidates that can be taken by the M transmission signal components that constitute the k-th transmission signal group.

5. The signal estimation apparatus according to claim 1, wherein
the controller is configured to have, as a logical function block, N arithmetic blocks, each of which includes R arithmetic units that respectively estimate the estimated values $xe_1^{(k)}$ to $xe_R^{(k)}$, in accordance with the number of the variable k (wherein R is an integer of 2 or more), and
an (r+1)-th arithmetic unit that is included in one arithmetic block corresponding to the k-th transmission signal group and that estimates an estimated value $xe_{r+2}^{(k)}$ (wherein r is a variable indicating each of R integers that are greater than or equal to 0 and that are less than or equal to R−1) estimates the estimated value $xe_{r+2}^{(k)}$ on the basis of N−1 estimated values $xe_{r+1}^{(s)}$ respectively estimated by N−1 r-th arithmetic units respectively included in N−1 arithmetic blocks that exclude one arithmetic block corresponding to the k-th transmission signal group out of the N arithmetic blocks (wherein s is a variable indicating an integer that is greater than or equal to 0 and that is less than or equal to N−1, but is not k).

6. The signal estimation apparatus of claim 5, wherein
the controller is configured to generate an internal matrix $A^{(k)}$ that is used to generate the estimated value $xe^{(k)}$, on the basis of the transmission path matrix H, the received signal y, and an initial value $\rho_0^{(k)}$ of a parameter set $\rho_{r+1}^{(k)}$ that includes M parameters used by the r-th arithmetic unit and that corresponds to the k-th transmission signal group, and initializes an initial value $xe_0^{(k)}$ of the estimated value $xe_r^{(k)}$ and initial values $v_0^{(k)}$ and $z_0^{(k)}$ of internal data $v_r^{(k)}$ and $z_r^{(k)}$ that are used by the r-th arithmetic unit to estimate the estimated value $xe_r^{(k)}$,
the r-th arithmetic unit included in one arithmetic block corresponding to the k-th transmission signal group estimates an estimated value $xe_{r+1}^{(k)}$ on the basis of the parameter set $\rho_{r+1}^{(k)}$, the received signal y, the transmission path matrix H, the internal matrix $A^{(k)}$, the internal data $v_r^{(k)}$ and $z_r^{(k)}$, and the estimated value $xe_r^{(k)}$, and
generates internal data $v_{r+1}^{(k)}$ and $z_{r+1}^{(k)}$ on the basis of the estimated value $xe_{r+1}^{(k)}$, the internal data $v_r^{(k)}$ and $z_r^{(k)}$, and a predetermined nonlinear function $\Psi_r^{(k)}$.

7. The signal estimation apparatus of claim 6, wherein the parameter set $\rho_r^{(k)}$ is learned by a learning operation using a loss function based on an error between the transmission signal x actually transmitted by the transmitting apparatus and the estimated signal xe actually estimated by the controller.

8. A signal estimation method of estimating a transmission signal x from a received signal y in a communication system,
the communication system including:
a transmitting apparatus that transmits the transmission signal x by using a transmitting antenna in which M transmitting array antennas are concentrically arranged (wherein M is an integer of 1 or more), each transmitting array antenna including N transmitting antenna elements arranged at equal intervals in a circular (wherein N is an integer of 2 or more), the transmission signal including N transmission signal groups, each transmission signal group including M transmission signal components respectively transmitted by the M transmitting array antennas that are different from each other; and
a receiving apparatus that receives the transmission signal x transmitted by the transmitting apparatus as the received signal y, by using a receiving antenna in which M receiving array antennas are concentrically arranged, each receiving array antenna including N receiving antenna elements arranged at equal intervals in a circular,
the signal estimation method comprising:
performing a discrete Fourier transform process on M×N received signal components, which are included in the received signal y and which are respectively received by M×N receiving antenna elements, by a unit of N received signal components received by each of the M receiving array antennas; and estimating an estimated signal xe containing M×N estimated signal components, which are estimated values of M×N transmission signal components, on the basis of the received signal y on which the discrete Fourier transform process is performed, and when the estimated signal xe is newly estimated, the estimating including an excluding operation of excluding an estimated value $xe^{(k)}$ of the M transmission signal components that constitute a k-th transmission signal group from the estimated signal xe newly estimated, and a updating operation of updating the estimated value $xe^{(k)}$ on the basis of an intermediate signal $xt^{(k)}$ obtained by the excluding operation and on the basis of the received signal y, thereby re-estimating the estimated signal xe (wherein k is a variable indicating each of integers that are greater than or equal to 0 and that are less than or equal to N−1).

9. A non-transitory program recording medium on which a computer program that allows a computer to execute a signal estimation method is recorded, the signal estimation method is a method of estimating a transmission signal x from a received signal y in a communication system, the communication system including:

a transmitting apparatus that transmits the transmission signal x by using a transmitting antenna in which M transmitting array antennas are concentrically arranged (wherein M is an integer of 1 or more), each transmitting array antenna including N transmitting antenna elements arranged at equal intervals in a circular (wherein N is an integer of 2 or more), the transmission signal including N transmission signal groups, each transmission signal group including M transmission signal components respectively transmitted by the M transmitting array antennas that are different from each other; and a receiving apparatus that receives the transmission signal x transmitted by the transmitting apparatus as the received signal y, by using a receiving antenna in which M receiving array antennas are concentrically arranged, each receiving array antenna including N receiving antenna elements arranged at equal intervals in a circular, the signal estimation method comprising:

performing a discrete Fourier transform process on M×N received signal components, which are included in the received signal y and which are respectively received by M×N receiving antenna elements, by a unit of N received signal components received by each of the M receiving array antennas; and estimating an estimated signal xe containing M×N estimated signal components, which are estimated values of M×N transmission signal components, on the basis of the received signal y on which the discrete Fourier transform process is performed, and when the estimated signal xe is newly estimated, the estimating including an excluding operation of excluding an estimated value $xe^{(k)}$ of the M transmission signal components that constitute a k-th transmission signal group from the estimated signal xe newly estimated, and a updating operation of updating the estimated value $xe^{(k)}$ on the basis of an intermediate signal $xt^{(k)}$ obtained by the excluding operation and on the basis of the received signal y, thereby re-estimating the estimated signal xe (wherein k is a variable indicating each of integers that are greater than or equal to 0 and that are less than or equal to N−1).

* * * * *